US007142709B2

(12) United States Patent
Girard

(10) Patent No.: US 7,142,709 B2
(45) Date of Patent: Nov. 28, 2006

(54) GENERATING IMAGE DATA

(75) Inventor: Martin Girard, Montreal (CA)

(73) Assignee: Autodesk Canada Co., Montreal (CA)

( * ) Notice: Subject to any disclaimer, the term of this patent is extended or adjusted under 35 U.S.C. 154(b) by 734 days.

(21) Appl. No.: 10/219,116

(22) Filed: Aug. 15, 2002

(65) Prior Publication Data
US 2004/0032409 A1 Feb. 19, 2004

(51) Int. Cl.
*G06K 9/00* (2006.01)
*G06T 15/60* (2006.01)
*G09G 5/00* (2006.01)

(52) U.S. Cl. .................... 382/154; 345/426; 345/582
(58) Field of Classification Search ................ 382/154; 345/419–427
See application file for complete search history.

(56) References Cited

U.S. PATENT DOCUMENTS

| | | | | |
|---|---|---|---|---|
| 4,667,190 A * | 5/1987 | Fant | .......................... | 345/568 |
| 5,742,749 A * | 4/1998 | Foran et al. | ................. | 345/426 |
| 5,870,097 A * | 2/1999 | Snyder et al. | ............. | 345/426 |
| 5,870,098 A * | 2/1999 | Gardiner | ...................... | 345/426 |
| 5,872,729 A * | 2/1999 | Deolaliker | .................. | 708/523 |
| 6,016,150 A * | 1/2000 | Lengyel et al. | ............ | 345/426 |
| 6,084,590 A * | 7/2000 | Robotham et al. | .......... | 345/419 |
| 6,169,553 B1 * | 1/2001 | Fuller et al. | ................ | 345/427 |
| 6,362,822 B1 * | 3/2002 | Randel | ....................... | 345/426 |
| 6,396,502 B1 * | 5/2002 | Cunniff | ...................... | 345/582 |
| 6,437,782 B1 * | 8/2002 | Pieragostini et al. | ....... | 345/426 |
| 6,466,207 B1 * | 10/2002 | Gortler et al. | ............. | 345/427 |
| 6,522,787 B1 * | 2/2003 | Kumar et al. | ............... | 382/268 |
| 6,549,203 B1 * | 4/2003 | Randel | ....................... | 345/426 |
| 6,570,578 B1 * | 5/2003 | Smirnov et al. | ............ | 345/629 |
| 6,664,962 B1 * | 12/2003 | Komsthoeft et al. | ........ | 345/426 |
| 6,760,024 B1 * | 7/2004 | Lokovic et al. | ............. | 345/421 |
| 6,771,263 B1 * | 8/2004 | Behrens et al. | ............. | 345/424 |
| 2002/0018063 A1 * | 2/2002 | Donovan et al. | ........... | 345/426 |
| 2002/0175914 A1 * | 11/2002 | Marshall et al. | ............ | 345/426 |
| 2003/0112237 A1 * | 6/2003 | Corbetta | ..................... | 345/426 |

FOREIGN PATENT DOCUMENTS

WO  WO 00/22576 A1  4/2000

* cited by examiner

*Primary Examiner*—Bhavesh M. Mehta
*Assistant Examiner*—Utpal Shah
(74) *Attorney, Agent, or Firm*—Gates & Cooper LLP

(57) ABSTRACT

A method, apparatus, and article of manufacture provide the ability to process image data. A data structure includes a plurality of nodes that represent processing to be performed upon image data. At least one node is generated as a three-dimensional object within a compositing space having a; least one light source. A viewport is defined in a space configured with a frustum enclosing the 3D object. A matte of the object is generated in relation to the light source within the space. The matte is accumulated in an accumulating shadow texture and the object is rendered including the accumulating shadow texture in an image frame defined by the frustum.

26 Claims, 17 Drawing Sheets

| | | | | | |
|---|---|---|---|---|---|
| 0 | 255 | 255 | 255 | 255 | 255 |
| 0 | 255 | 255 | 255 | 255 | 255 |
| 0 | 255 | 255 | 255 | 255 | 255 |
| 0 | 0 | 255 | 255 | 255 | 255 |
| 0 | 0 | 255 | 255 | 255 | 255 |
| 0 | 0 | 0 | 255 | 255 | 255 |
| 0 | 0 | 0 | 255 | 255 | 255 |
| 0 | 0 | 255 | 255 | 255 | 255 |
| 0 | 0 | 0 | 0 | 255 | 255 |

Figure 14

GENERATING IMAGE DATA

BACKGROUND OF THE INVENTION

1. Field of the Invention

The present invention relates to generating shadow image data in three-dimensional compositing environments.

2. Description of the Related Art

Many post production processes have been devised and employed over the years to enhance movie productions or video films with what is commonly referred to as "special effects". Such image enhancement has long been provided by means of using dedicated hardware, either as a scale model to be filmed and subsequently composited in post production or, more recently, by means of effects generators such as computer apparatus configured to output rendered image components to be also subsequently composited.

Technical advances in image processing systems have enabled the generalisation of the "blue screen" technique in video environments and "green screen" technique in cinematographic environments, whereby actors or models are filmed in a studio configured with blue or green saturated surroundings in order to generate a clip of foreground image frames. An alternative clip of background image frames is subsequently generated and a compositing process allows an editor to seamlessly blend the foreground and background image frames by means of keying part of the corresponding video signals, for instance the luminance or chrominance signal.

In modern image processing systems providing real-time image data processing capability, image components within an image frame such as foreground frames of a model filmed against a blue screen or rendered three-dimensional models, all exist as hierarchical sub-structures of data processing nodes within a main structure, which defines one such final image frame. Typically, such image components are generated as polygon-based three dimensional objects to be interacted with within a three-dimensional volume, known as a compositing volume or space. An image editor using such a system can amend parameters and/or data in any of said data processing nodes to aesthetically improve any image component within an image frame and assess the effectiveness of his editing in realtime.

The concept of "post-production" is however changing, as modern video or cinematographic productions increasingly develop such image components in parallel with generating actual film footage, as opposed to once the filming has finished, in order to reduce total production lead-time and costs and generate earlier revenue for the producers. A film director is thus likely to preview the day's footage with incorporating such image components composited therein at a low resolution, to determine whether additional filming is required or not before filming the next scene. For such purposes, relatively inexpensive computers may be used as image processing systems, especially when configured with hardware-based graphics accelerators, which are well known in the art.

An important problem however hinders the development of the use of inexpensive systems as described above, as hardware graphics accelerators are typically designed to best process primitives such as polygons but, although numerous methods are known with which to generate shadows of polygon objects in three dimensional environments such as analytical shadows or pixel-based shadows, said methods do not yet allow image components within such polygons, which may be understood as textures, to cast shadows themselves.

BRIEF SUMMARY OF THE INVENTION

According to an aspect of the present invention, there is provided an apparatus for processing image data, comprising image data storage means, memory means for storing instructions and a data structure including a plurality of image data processing nodes representing processing to be performed upon said image data, processing means for processing said instructions, wherein said instructions define operations to be performed in order to process said image data according to said data structure and are processed by said processing means to perform the steps of generating at least one of said data processing nodes as a three-dimensional object within a compositing space having at least one light source; defining a viewport in said space configured with a frustrum enclosing said object; generating a matte of said object in relation to said light source within said volume; accumulating said matte in an accumulating shadow texture and rendering said object including said accumulating shadow texture in an image frame defined by said frustrum.

According to another aspect of the present invention, there is provided a method of processing image data, including image data stored in storage means, a data structure stored in memory means comprising a plurality of image data processing nodes representing processing to be performed upon said image data, and processing means, wherein said method comprises the steps of generating at least one of said data processing nodes as a three-dimensional object within a compositing space having at least one light source; defining a viewport in said space configured with a frustrum enclosing said object; generating a matte of said object in relation to said light source within said space; accumulating said matte in an accumulating shadow texture and rendering said object including said accumulating shadow texture in an image frame defined by said frustrum.

BRIEF DESCRIPTION OF THE SEVERAL VIEWS OF THE DRAWINGS

FIG. 14 further depicts a magnified portion of the opaque airship occluding matte shown in FIG. 9B, having pixels configured with levels of opacity;

BEST MODE FOR CARRYING OUT THE INVENTION

The invention will now be described by way of example only with reference to the previously identified drawings.

FIG. 1

Figure 1:
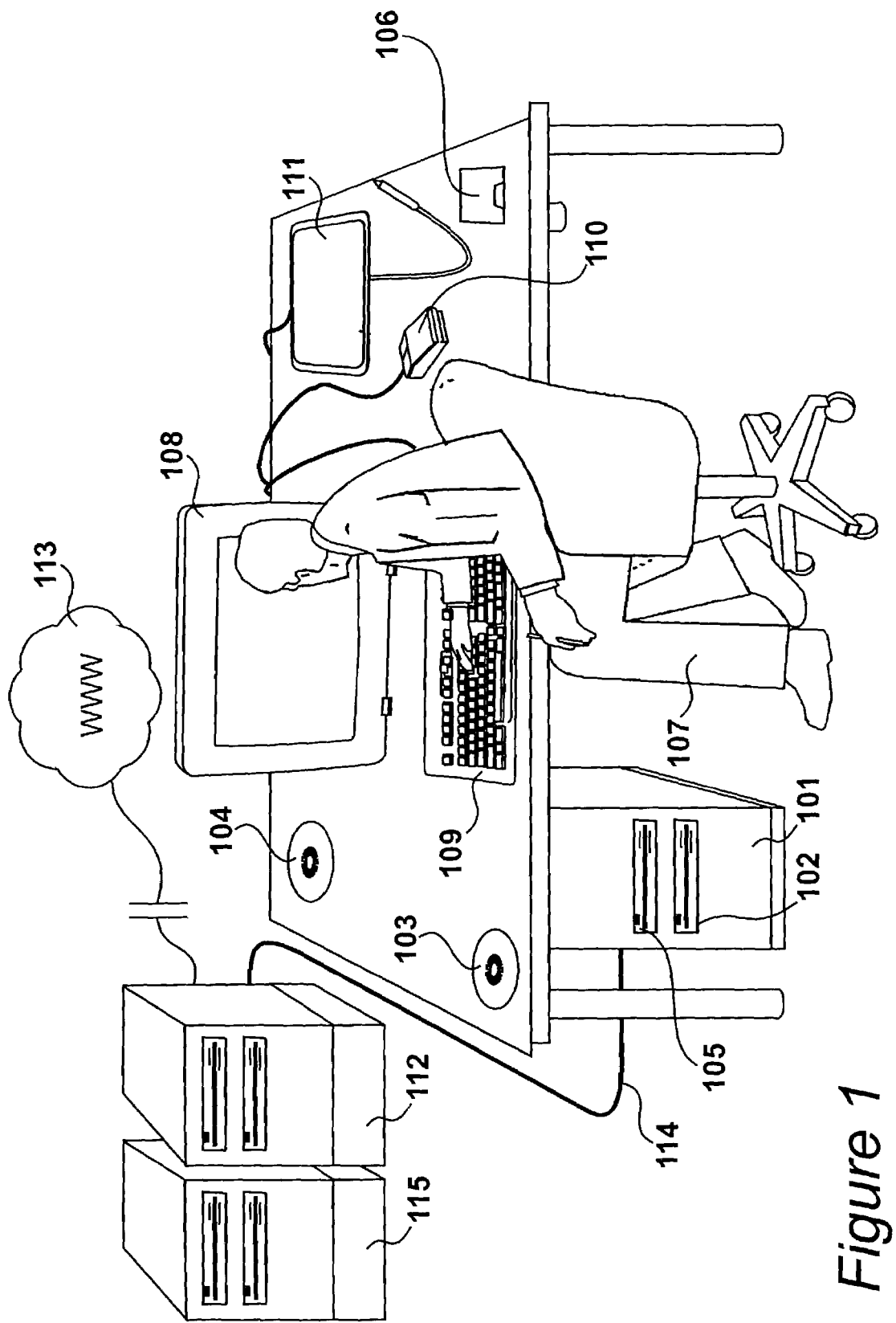
FIG. 1 shows an image processing system operated by an artist, which comprises an inexpensive computer system.

An image data processing system is shown in FIG. 1 and includes a programmable computer 101 having a drive 102 for receiving CD-ROMs 103 and writing to CD-RAMs 104 and a drive 105 for receiving high-capacity magnetic disks, such as ZIP™ disks 106. According to the invention, computer 101 may receive program instructions via an appropriate CD-ROM 103 or scene data may be written to a re-writable CD-RAM 104, and program instructions may similarly be received from or scene data may be written to a ZIP™ disk 106 by means of ZIP™ drive 105. In addition to writing image data in the form of a scene to a disk 106 or CD-RAM 104, the image processing system computer operator, i.e. artist 107, may write completed rendered frames to said CD-RAM 104 such that scene data, in the form of video material, may be transferred to another compositive station or similar.

Output data is displayed on a visual display unit 108 and manual input is received via a keyboard 109 and a mouse 110. Alternatively, the image data processing system may also include stylus-and-tablet input means 111. Instructions may be transmitted to and received from a network server 112 or the internet 113, to which said server 112 provides access, by means of network connection 114 and image data in the form of frames may be transmitted to and received from a framestore 115.

FIG. 2

Figure 2:
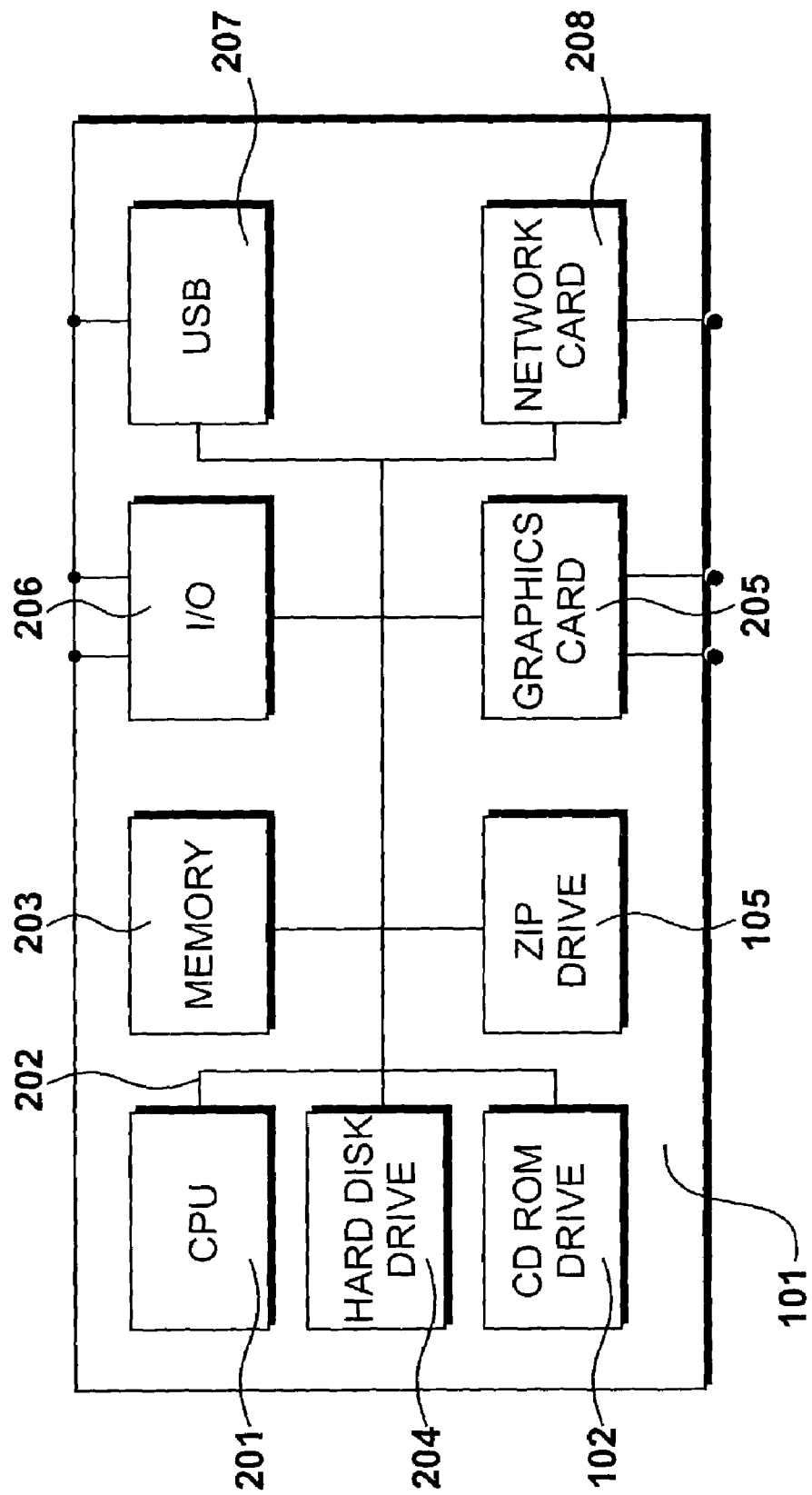
FIG. 2 shows a typical internal architecture of the computer system shown in FIG. 1, including a graphics accelerator card and a memory.

The components of computer system 101 are further detailed in FIG. 2. The system includes a Pentium 4™ central processing unit (CPU) 201 which fetches and executes instructions and manipulates data via a system bus 202 providing connectivity with a larger main memory 203. Memory 203 comprises between two hundred and fifty-six megabytes and one gigabyte of dynamic randomly accessible memory and executable programs which, along with data, are received via said bus 202 from a hard disk drive 204. Hard disc drive (HDD) 204 provides non-volatile bulk storage of instructions and data.

A graphics card 205 receives graphics data from the CPU 201, along with graphics instructions. Preferably, the graphics card 205 includes substantial dedicated graphical processing capabilities, so that the CPU 201 is not burdened with computationally intensive tasks for which it is not optimised.

CD-ROM re-writer 102 receives processing instructions and data from an external CD-ROM medium 103 and writes instructions and data to an external CD-RAM medium 104. ZIP™ drive 105 receives processing instructions and data from an external disk medium 105 and writes instructions and data thereto. Input/output interface 206 provides connectivity to peripherals such as mouse 110, keyboard 109 or stylus/tablet 111. A Universal Serial Bus 207 is provided as an alternative means of providing connectivity to peripherals such as mouse 110, keyboard 109 or stylus/tablet 111. Network card 208 provides connectivity to server 112 and the internet 113, and framestore 114.

The equipment shown in FIG. 2 constitutes an inexpensive personal computer of fairly standard type, such as an IBM™ PC compatible or Apple™ Mac.

Figure 3:
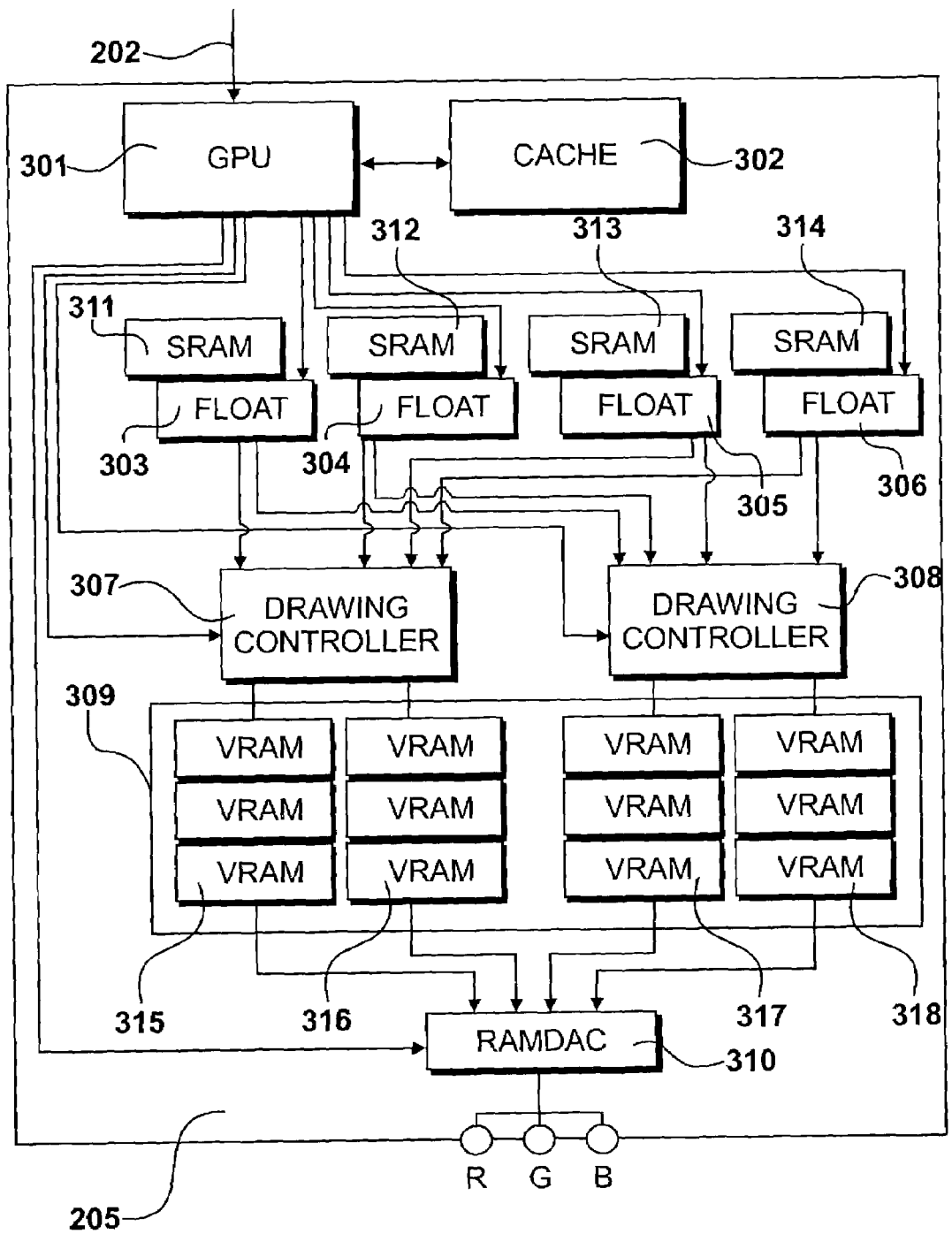
FIG. 3 shows a typical internal architecture of the graphics accelerator card shown in FIG. 2.

Instructions according to the present invention may be executed by the image processing system 101 to display 3D graphical objects on the video display unit 108, wherein the CPU 201 may transfer information to and from the 3D graphics accelerator 205 according to a programmed input/output protocol over the bus 202 which is, for instance, a crossbar switch or other bus connectivity logic. A typical architecture of a 3D graphics accelerator 205 is shown in further detail in FIG. 3.

FIG. 3

Functionally, instructions according to the invention preferably conform to an application programmer interface (API) such as open GL which, when processed, generates processor commands and data that define a geometric primitive, such as a polygon, for output on VDU 108. CPU 201 transfers these commands and data to memory 203. Thereafter, CPU 201 operates to transfer said data to the graphics accelerator 205 over the bus 202. In an alternative embodiment, said graphics accelerator 205 is coupled to the memory 203 through a direct port, such as the advanced graphics port (AGP) promulgated by Intel Corporation. The 3D graphics accelerator 205 in computer system 101 provides increased performance for processing geometric primitives to be rendered as three-dimensional objects on VDU 108, thus reducing the need for an expensive work station and the associated cost thereof.

The 3D graphics accelerator 205 principally comprises a graphics processing unit 301 (GPU) configured with a memory cache 302, a plurality of floating point processors 303 to 306, a plurality of drawing controllers 307 and 308, a frame buffer 309 comprising video ram (VRAM) and a random access memory digital to analogue converter (RAMDAC) 310.

The graphical processing unit 301 interfaces the graphics accelerator 205 to the bus 202 and controls the transfer of data between other processors or memory in accelerator 205 and also pre-processes triangle and vector data as well as decompresses geometric data when necessary. Graphics processing unit 301 further interfaces to each of the plurality of floating point processors 303 to 306, wherein each of said processors connects to a respective memory 311 to 314, which are used for microcode and data storage. Functionally, floating point processors 303 to 306 receive high level drawing commands from GPU 301 and perform transformation, clipping, lighting and set-up operations on received geometry data in order to generate graphics primitives such as triangles, lines, etc for rendering three-dimensional objects on the screen 108.

Each of the floating point processors 303 to 306 connects to each of two drawing controllers 307 and 308, each of which performs screen space rendering of the various graphics primitives and operates the sequence to fill the completed pixels into the frame buffer 309. Drawing controllers 307 and 308 concurrently render an image into said frame buffer 309 according to a draw data packet received from one of the floating point processors 303 to 306, or according to a direct data packet received from the GPU 301.

In operation, each of the floating point processors 303 to 306 broadcasts the same data to the two drawing controllers 307 and 308 such that the same data is always on both sets of data lines coming from each floating point processor 303 to 306. Thus, for instance, when the floating point processor 303 transfers data, said processor 303 transfers the same data to the drawing controllers 307 and 308. Each of the respective drawing controllers 307 and 308 couples to frame buffer 309, which comprises four banks of VRAM memory 315 to 318. Drawing controller 307 couples to video ram banks 315 and 316 and drawing controller 308 couples to video ram banks 317 and 318, respectively. Each bank 315 to 318 comprises three video ram chips, as shown. The totality of video ram arrays 315 to 318 collectively form frame buffer 309, which stores pixels rendered by drawing controllers 307 and 308 corresponding to 3D objects.

Each of the video ram memories 315 to 318 couples to a random access memory digital to analogue converter 310 (RAMDAC). Said RAMDAC 310 comprises a programmable video timing generator and programmable pixel clock synthesiser along with crossbar functions, as well as traditional colour look-up tables and triple video DAC circuits. RAMDAC 310 in turn couples to the video display unit 108.

The architecture of the 3D graphics accelerator 205 described above may vary to a large extent and is here only provided for illustrative purposes. Those skilled in the art will be familiar with the functionality and performance benefits thereof.

Figure 4:
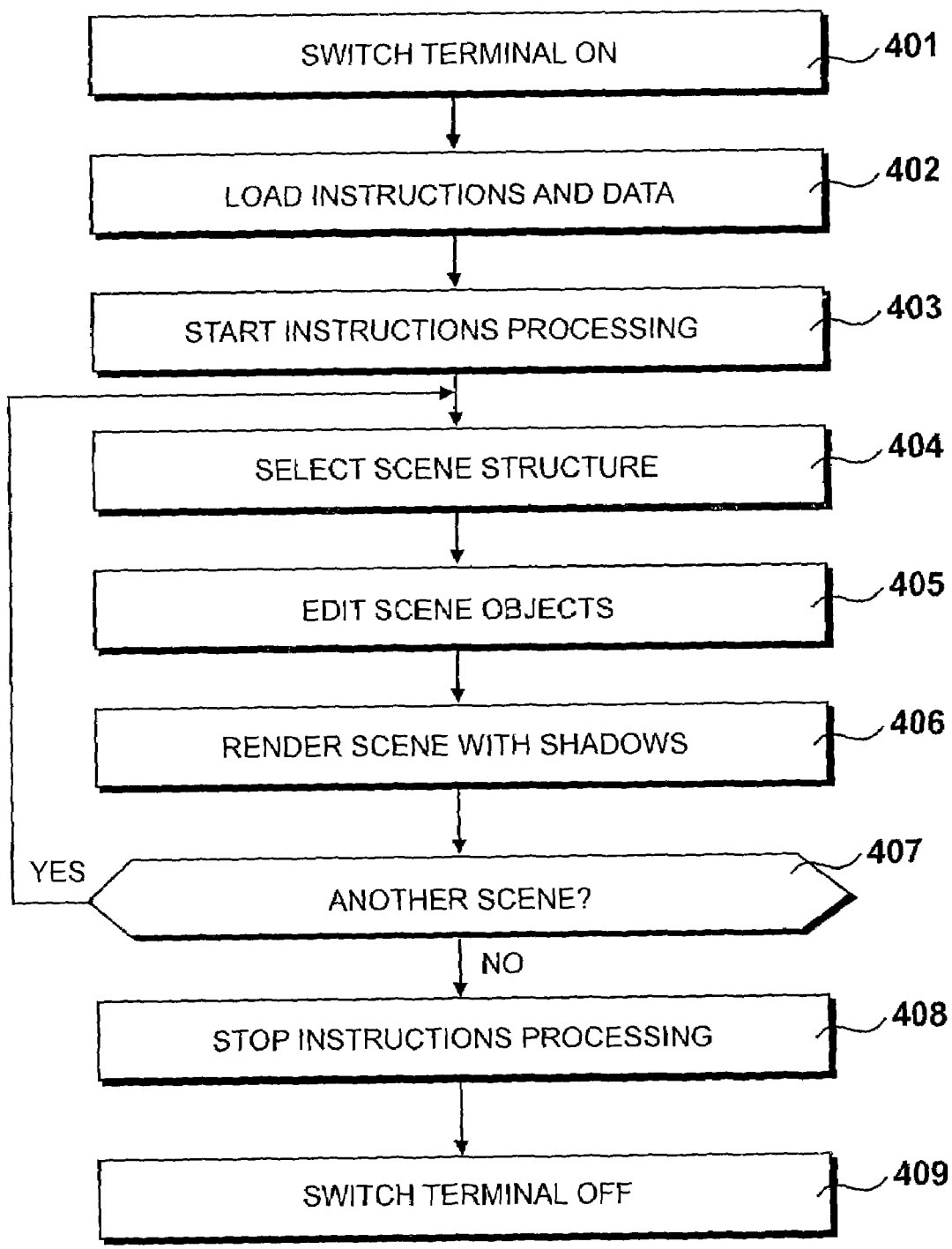
FIG. 4 details the operational steps according to which the artist shown in FIG. 1 operates the image processing system according to the present invention.

The operational steps according to which artist 107 operates image processing system 101 are outlined in FIG. 4.

FIG. 4

At step 401, the computer system 101 is switched on, whereby all instructions and data sets necessary to process image data are loaded at step 402, including instructions according to the present invention to generate shadows in said image data. Upon completing the loading operation of step 402, the processing of said instructions according to the present invention by CPU 201 starts at step 403.

At step 404, image data from a single frame or, alternatively, from a clip of frames is acquired from hard disk drive 204, network server 112 or frame store 115 such that it can be displayed to artist 107 on VDU 108 for subsequent editing at step 405. Preferably, said image data is acquired as a scene structure, which will be further detailed below and comprises a plurality of scene objects. Said editing step 405 thus comprises editing said scene objects of said scene structure. Upon completing the editing step 405, said scene structure may now be rendered with shadows according to the present invention at step 406.

At step 407, a question is asked as to whether another image frame or another clip of image frames, ie another scene structure, require processing by image processing system 101 according to the present invention. If the question of step 407 is answered positively, control is returned to step 404 such that new image data can be acquired from hard disk drive 204, network server 112 or frame store 115. Alternatively, if the question asked at step 407 is answered negatively, then artist 107 is at liberty to stop the processing of the instructions according to the present invention at step 408 and, eventually, switch image processing system 101 off at step 409.

The contents of main memory 203 subsequently to the selection step 404 of a scene structure are further detailed in FIG. 5.

FIG. 5

An operating system is shown at 501 which comprises a reduced set of instructions for CPU 201, the purpose of which is to provide image processing system 101 with basic functionality. Examples of basic functions include for instance access to files stored on hard disk drive 204 or DVD/CD ROM drive 102 or ZIP drive 105 and management thereof, network connectivity with network server 112, the Internet 113 and frame store 115, interpretation and processing of the input from keyboard 109, mouse 110 or graphic tablet 111. In the example, the operating system is Windows 2000 Professional™ provided by the Microsoft corporation of Redmond, Calif., but it will be apparent to those skilled in the art that the instructions according to the present invention may be easily adapted to function under different other known operating systems, such as IRIX™ provided by Silicon Graphics Inc or LINUX, which is freely distributed.

An application is shown at 502 which comprises the instructions loaded at step 402 that enable the image processing system 101 to perform steps 403 to 407 according to the invention within a specific graphical user interface displayed on video 108.

Application data is shown at 503 and 504 and comprises various sets of user input-dependent data and user input-independent data according to which the application shown at 502 processes image data. Said application data primarily includes a data structure 503, which references the entire processing history of the image data as loaded at step 404 and will hereinafter be referred to as a scene structure. According to the present invention, scene structure 503 includes a scene hierarchy 504, which comprehensively defines the dependencies between each component within an image frame as hierarchically-structured data processing nodes, an example of which will be described further below. Accordingly, scene structure 503 also includes type data 505 defining the various types of data processing nodes present within the structure or which may be inserted therein as a consequence of image data editing at step 405. Scene structure 503 eventually includes object class data 506 defining the various types of three-dimensional objects said data processing nodes 505 are generated as within a three-dimensional compositing space.

Further to the scene structure 503, application data also includes scene data 507 to be processed by said nodes 505 according to the hierarchy 504 in order to generate one or a plurality of image frames, ie the parameters and data which, when processed by their respective data processing nodes, generate the various components of said image frame. In the example, scene data 507 comprises image frames 508 digitised from film and subsequently stored in frame store 115, three-dimensional models 509 defined as a plurality of polygons or possibly non-uniform rational b-splines (NURBS). Scene data 507 also comprises bitmapped textures 510 to be applied to said polygons of said three-dimensional models 509, for instance to simulate a material property such as wood or steel depending upon a model 509 depicting a tree or a plane. Scene data 507 further includes light maps 511 to be applied to said polygons in order to simulate the light refraction properties of the material depicted by textures 510, for instance because the wood of a tree would absorb more light than the steel skin of a plane. Scene data 507 eventually includes mattes 512 generated according to conventional matte processing techniques and which will be further described below, from which the shadow occluding mattes according to the present invention will be drawn.

Finally, user input data is shown at 513, which comprises user input-dependent data identifying parameters and/or data input by artist 107 by means of keyboard 109, mouse 110 and/or graphic tablet 111 to edit scene structure and data 503, 504 at step 405.

Figure 6:
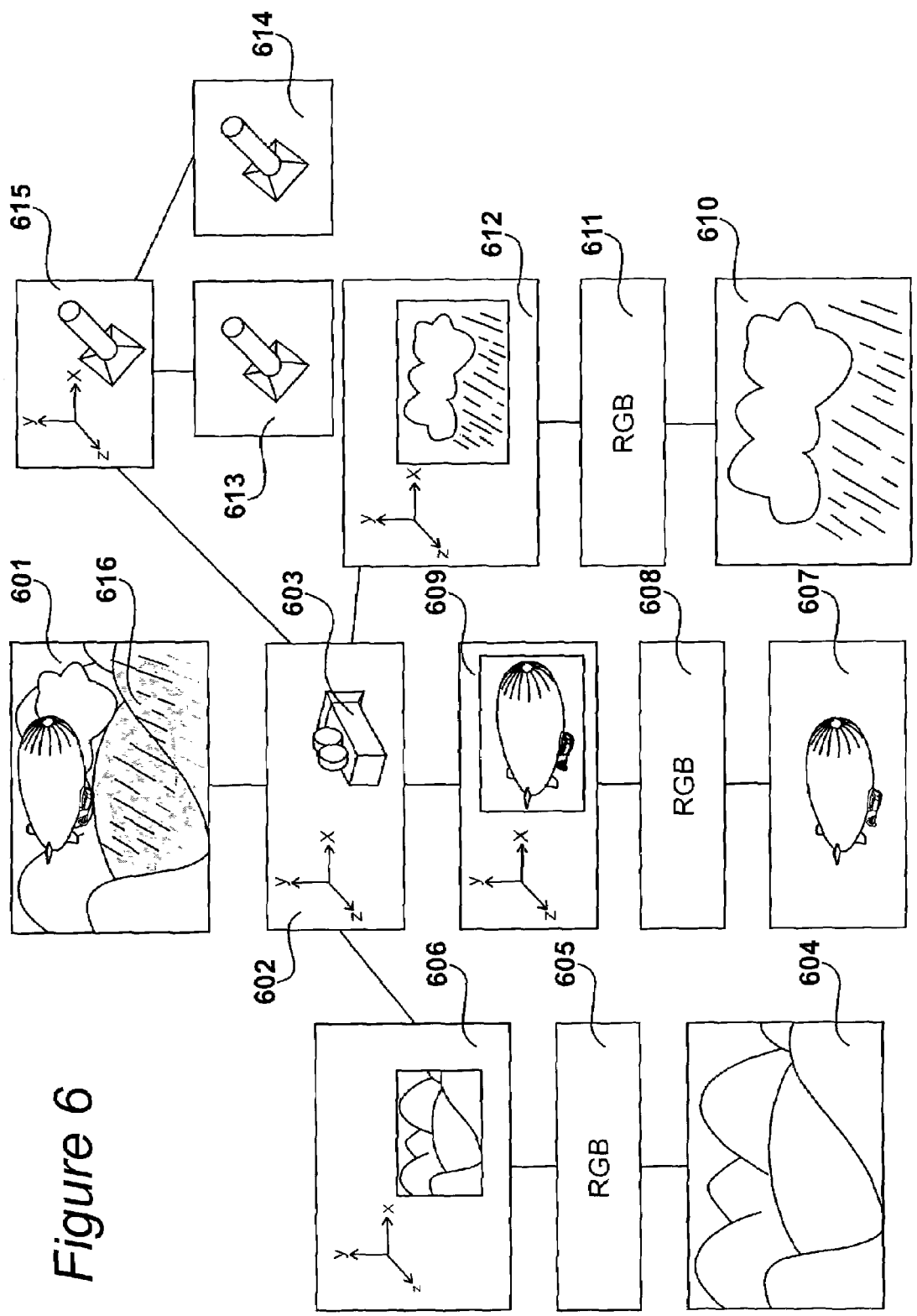
FIG. 6 illustrates a typical scene structure as a hierarchy of data processing nodes shown in FIG. 5, including a background image frame and two distinct foreground image frames.

A simplified example of a data structure 503 selected at step 404 and including scene data 507, also known to those skilled in the art as an edit decision list or image process tree, is shown in FIG. 6 as defining the various components of an image frame.

FIG. 6

A process tree consists of hierarchical, sequentially linked data processing nodes, each of which specifies a particular processing task required in order to eventually achieve scene output data 601 which, in the example, comprises an airship flying over a range of hills over which the rain is falling from a cloud. The scene, or output image frame 601 thus requires the output from an image keying node 602, which defines the viewport 603 through the frustum of which output image 601 will be rendered.

Image keying node 602 calls on a plurality of further graphic data processing nodes to obtain all of the input data it requires to generate the required image components. In effect, all of the nodes in the process tree define branches of parent and children nodes and sub-divisions thereof and, in so far as the graphical nodes of the tree shown in FIG. 6 are concerned, each branch of nodes born from the graphical parent node 602 defines a layer or an object or a combination thereof. The purpose of image keying node 602 is thus to composite the layers, e.g. superimpose the three layers and two objects shown in the example, which are further detailed below.

In the example, the image keying node 602 initially requires a background frame depicting the range of hills from frame processing node 604, which is subsequently processed by a colour correction processing node 605 and subjected to position tracking within a three dimensional compositing space by a motion tracking processing node 606. Image keying node 602 next requires a first foreground frame depicting an airship from frame processing node 607, which is also subsequently processed by a colour correction processing node 608 and similarly tracked within a three-dimensional compositing space by motion tracking processing node 609. Image keying node 602 next requires a second foreground frame depicting the cloud and rain falling therefrom from frame processing node 610 which, in a similar manner to frames fetched by frame processing nodes 604 and 607, is colour-corrected by a colour correction processing node 611 and tracked by a motion tracking processing node 612.

Upon compositing the three frames as described above, i.e. separating both the airship and the cloud and rain from their respective background to superimpose them on to the "hills" frame, a problem arises in that neither said airship nor said cloud respectively cast any realistic shadow over said hills, simply because said airship and clouds were never in front of the camera which filmed the hills in the background frame. Artificial shadows must therefore be generated for both said airship and said cloud for output image data 601 to appear realistic. Accordingly, two light sources are introduced within the three-dimensional compositing space by light processing nodes 613 and 614, which are respectively motion-tracked by a motion tracking processing node 615, whereby artificial light emitted by said artificial light sources will impact both said airship frame and said cloud frame respectively of frame processing nodes 607 and 610, such that the required realistic shadow 616 can be generated within output image data 601.

Figure 5:
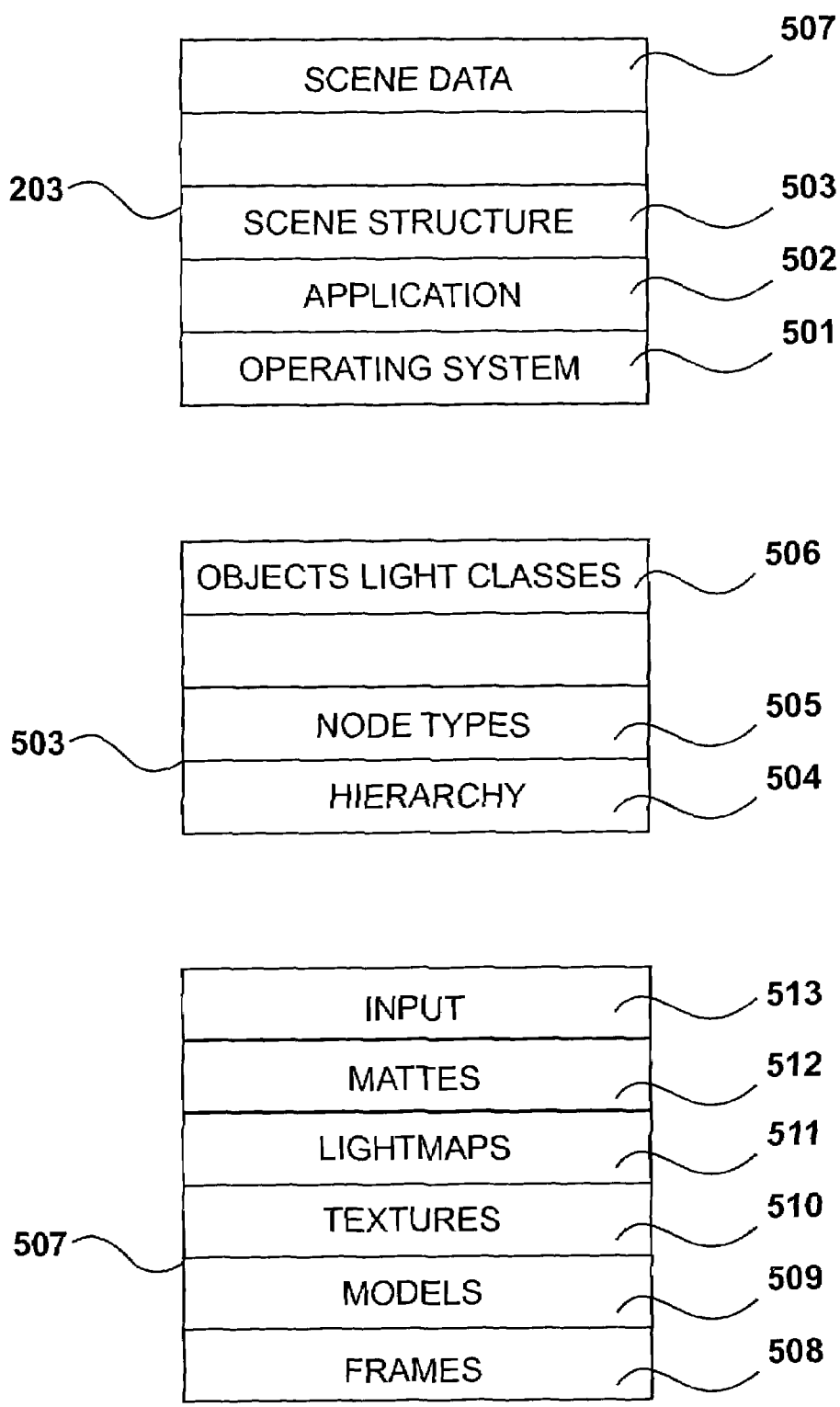
FIG. 5 details the contents of the memory shown in FIG. 2 upon completing the scene structure selecting step shown in FIG. 4, including a data structure.
Figure 7:
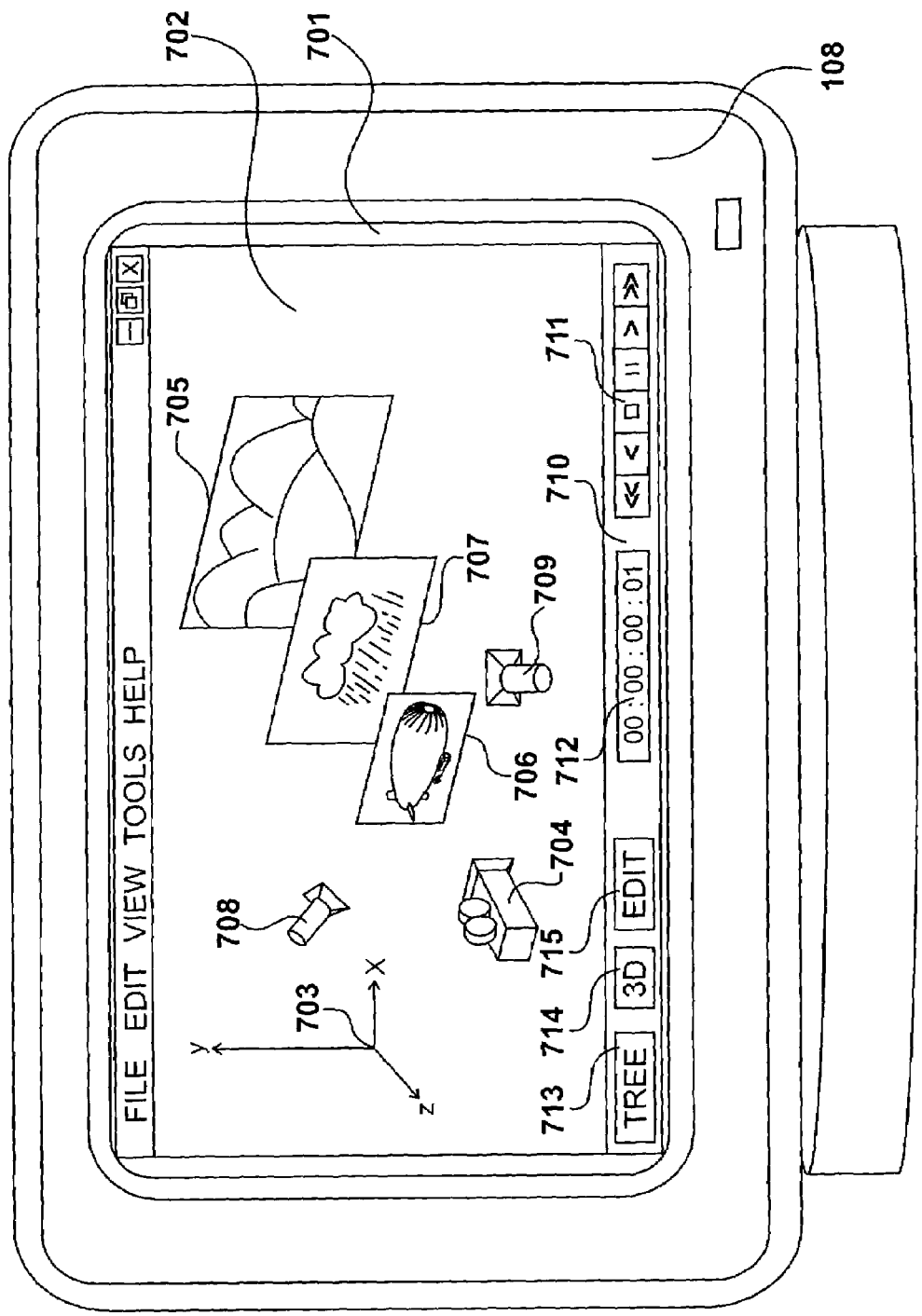
FIG. 7 provides a graphical representation of the graphical user interface of the application shown in FIG. 5, wherein the various nodes shown in FIG. 6 are displayed as three-dimensional objects and one such frame represents an airship.

The plurality of data processing nodes and data thereof described in FIGS. 5 and 6 are preferably displayed as three-dimensional objects within a three-dimensional compositing space within the graphical user interface of application 502 on VDU 108. Said graphical user interface is shown in FIG. 7.

FIG. 7

The GUI 701 of application 502 is divided into a plurality of functional areas, portions of which are user-operable. A first area displays a conventional three-dimensional space 702 configured with orthogonal X, Y and Z axis's 703. Data processing nodes 606 to 615 are displayed therein as three-dimensional objects, the respective representation of which is a function of the specific object class 506 of a node and the specific scene data 507 to be processed by said node. Accordingly, a viewport 704 is shown as the three-dimensional representation of image keying node 602 generating viewport 603 and is equipped with a user-configurable view frustum within which the "hill" background frame and the two "airship" and "cloud" foreground frames have been positioned.

In the preferred embodiment of the present invention, said frames are generated within space 702 as three-dimensional objects respectively comprising a single polygon defining a two-dimensional plane to which the corresponding RGB image frame acquired by the frame processing node from hard disk drive 204, network server 112, the Internet 113 or frame store 115 is applied as a texture 510. Preferably, such two-dimensional planes are equipped with a frame-playing function, such that a clip of image frames may be separately played at a synchronous or asynchronous speed in each of said distinct planes, known to those skilled in the art as players.

Thus, the background "hill" frame of frame processing node 604 is generated as a first player object 705, the airship frame of frame processing node 607 is generated as a second player object 706 and the second foreground image frame of frame processing node 610 is generated as a third player object 707. In the example, the final composited output image data 601 preferably depicts the airship in front of the cloud, thus said third player object 707 depicting the cloud is positioned between said first "hill" player object 705 and second "airship" player object 706.

Still in accordance with the example described herein, the two artificial light sources of light processing node 613 and 614 are respectively generated as spot-light objects 708 and 709 within the three-dimensional compositing space 702. Thus, each object so generated within said space 702 is equipped with three-dimensional positional data, which artist 107 may subsequently edit according to step 405.

A second area 710 comprises user-operable conventional clip navigation widgets 711 allowing artist 107 to rewind, backward play, stop, pause, forward play or fast forward the sequential order of image frames either generated as output image data through viewport 704 or respectively shown in players 705, 706 and 707 if respective frame processing nodes 604, 607 or 610 were required to fetch a clip of frames as opposed to a single frame.

A counter area 712 is provided in close proximity to navigation widgets 711 and divided into an hour counter, minute counter, seconds counter and frame counter, whereby said frame counter may operate in base twenty-four, base thirty or base sixty depending upon the provenance of the clip, e.g. respectively cinema, video or high-definition television. Said counter area 712 enables artist 107 to accurately determine where the currently displayed image frame is located within the complete sequence of the clip.

A first user-operable switch 713 is also provided within area 710 of GUI 701, the manipulation of which by artist 107 via preferably, but not exclusively, mouse 106 allows the first display area to display a graphical representation of the hierarchy 504 as shown in FIG. 6 and defining the image components therein shown as three-dimensional objects in the Figure. A second user-operatable switch 714 is also provided in close proximity, the manipulation of which by artist 107 returns the functionality of said first display area to displaying said hierarchy as three-dimensional objects within compositing space 702. A third user-operable switch 715 is finally provided in second display area 710, the manipulation of which by artist 107 allows said artist to edit any parameters and/or data associated with a particular object from amongst the plurality of said objects within space 702.

It is known to generate shadows of three-dimensional objects in three-dimensional environments, such as the compositing space 702 shown in FIG. 7. Indeed, a variety of techniques are known to those skilled in the art with which to cast shadows of an object close to a light source onto a different object located behind said objects in relation to said light source.

One such technique is ray-tracing, which is considered by those skilled in the art as the most accurate for producing the required lighting and shadowing effects but, because of its software-centric nature, is extremely CPU-intensive and thus slow. Such a technique would be for instance employed to generate the final output image data 601 at the highest possible resolution for presentation to audiences and requires fairly expensive image processing systems within which the functionality of 3D graphics accelerators, such as accelerator 205, is useless.

Recent hardware graphics accelerators, of which accelerator 205 is a typical example, such as a Quadro4 900 XGL accelerator card manufactured by the Nvidia Corporation of Santa Clara, Calif., are preferably used for speeding up the generation of shadows at lower resolutions for previewing purposes, by means of shadow volumes or shadow-mapping shadowing techniques. The shadow volumes technique involves projecting a silhouette of each object into the scene, adding polygons to said scene to represent each shadow and making use of the Z buffer ordering to determine if a rendered polygon is shadowed or not. Shadow-mapping involves rendering the scene from the viewpoint of the light sources within said scene and, when rendering said scene, translating each pixel into light frames of reference. Again, shadow mapping makes use of Z buffer ordering to determine if a pixel is shadowed or not.

Figure 8:
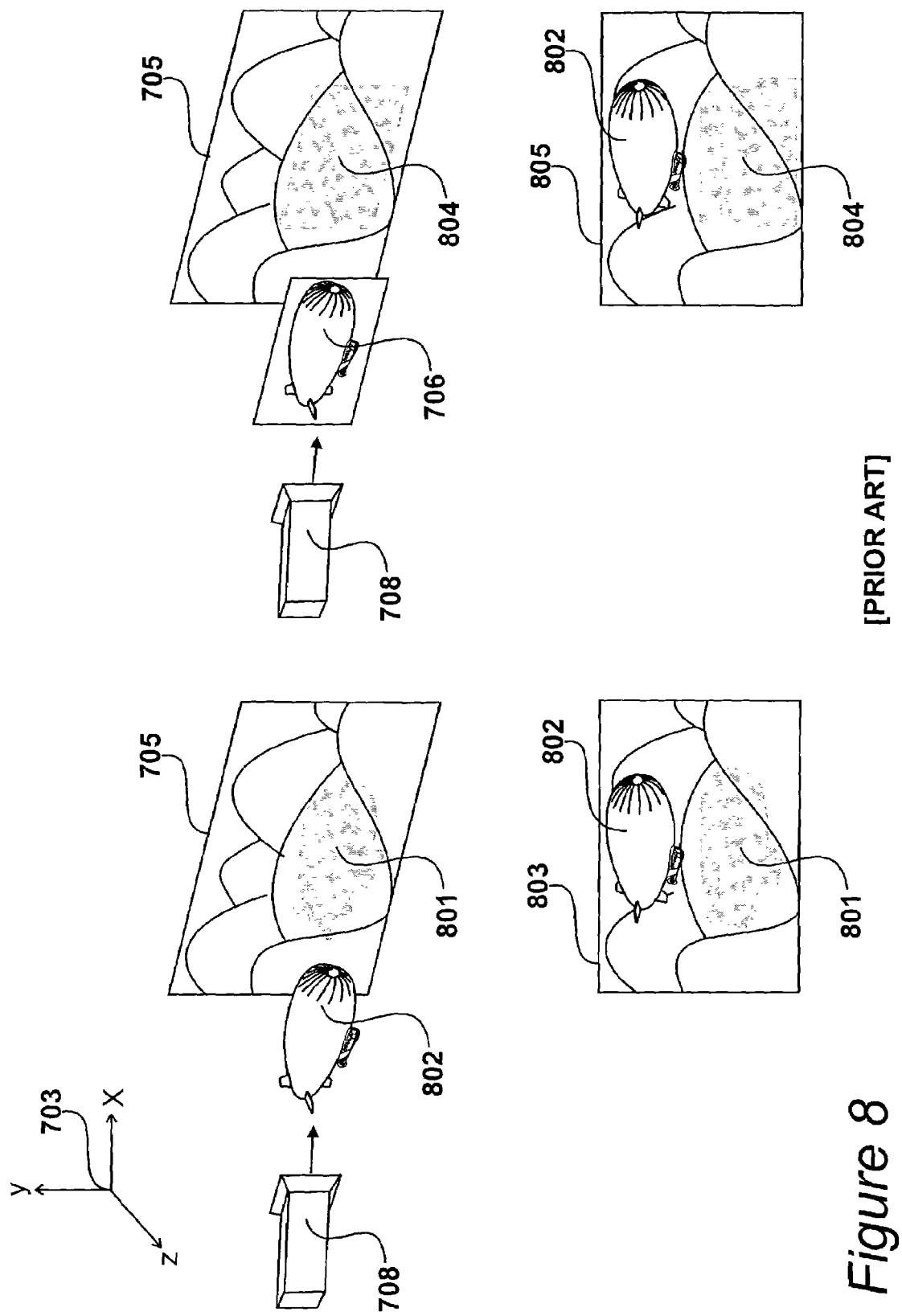
FIG. 8 illustrates a problem when generating a shadow of the airship shown in FIGS. 6 and 7 according to the known prior art, which is solved by the present invention.

Although such techniques are well known to those skilled in the art to generate shadows of three-dimensional model generally comprising a mesh of vertices, a simple example of which would be a cube. A problem however exists if said objects is a player, such as player object 705, only the shadow of the content of which is required, because the above techniques invariably generate a shadow of the player itself. The above problem of the known prior art is illustrated in FIG. 8.

FIG. 8

Player object 705 is shown within a three-dimensional compositing space having a set of X, Y and Z orthogonal axes 703. Upon positioning an artificial light source such as spot-light 708, it is relatively easy to generate a shadow 801 of a three-dimensional airship model 802 comprising a mesh of vertices 509 in the general shape of an airship to which an appropriately metallic texture 510 is applied and, optionally, to which one or a plurality of light maps 511 are further applied. Upon rendering the scene described above through the frustum of a viewport, such as viewport 704, an output image frame 803 is obtained within which said airship is composited and the realism of said compositing is increased by the rendering of a corresponding airship shadow 801 therein. The example herein above described is very well known to those skilled in the art, whether the rendering of output image frame 803 is effected for the purpose of generating movie frames, video frames or the output of an interactive entertainment application, such as a video game. In the example of output image frame 803, it is easy to process shadow 801 because shadowing techniques according to the known prior art consider the entirety of airship object 802 as casting a shadow.

In compositing environments, however, compositing operations more often than not require the superimposition of a plurality of image frames, wherein the benefits provided by the additional dimension of the compositing space 702, especially in terms of artistic/creative freedom, are severely outweighed by the fact that employing said techniques according to the known prior art with an airship depicted within a player object, such as player object 706, results in a shadow 808 having the shape of said player 706, as opposed to the shape of the airship in the image frame depicted therein as a texture 510. Accordingly, upon rendering an output image frame 805 according to the prior art process described in relation to output image frame 803, airship 802 is again realistically composited within the image frame 805 by a means of keying out the background of said airship within layer object 706, but the rectangular shadow 804 of said player object 706 severely hinders the level of realism supposedly conveyed when viewing said output image frame 805.

Figure 9A:
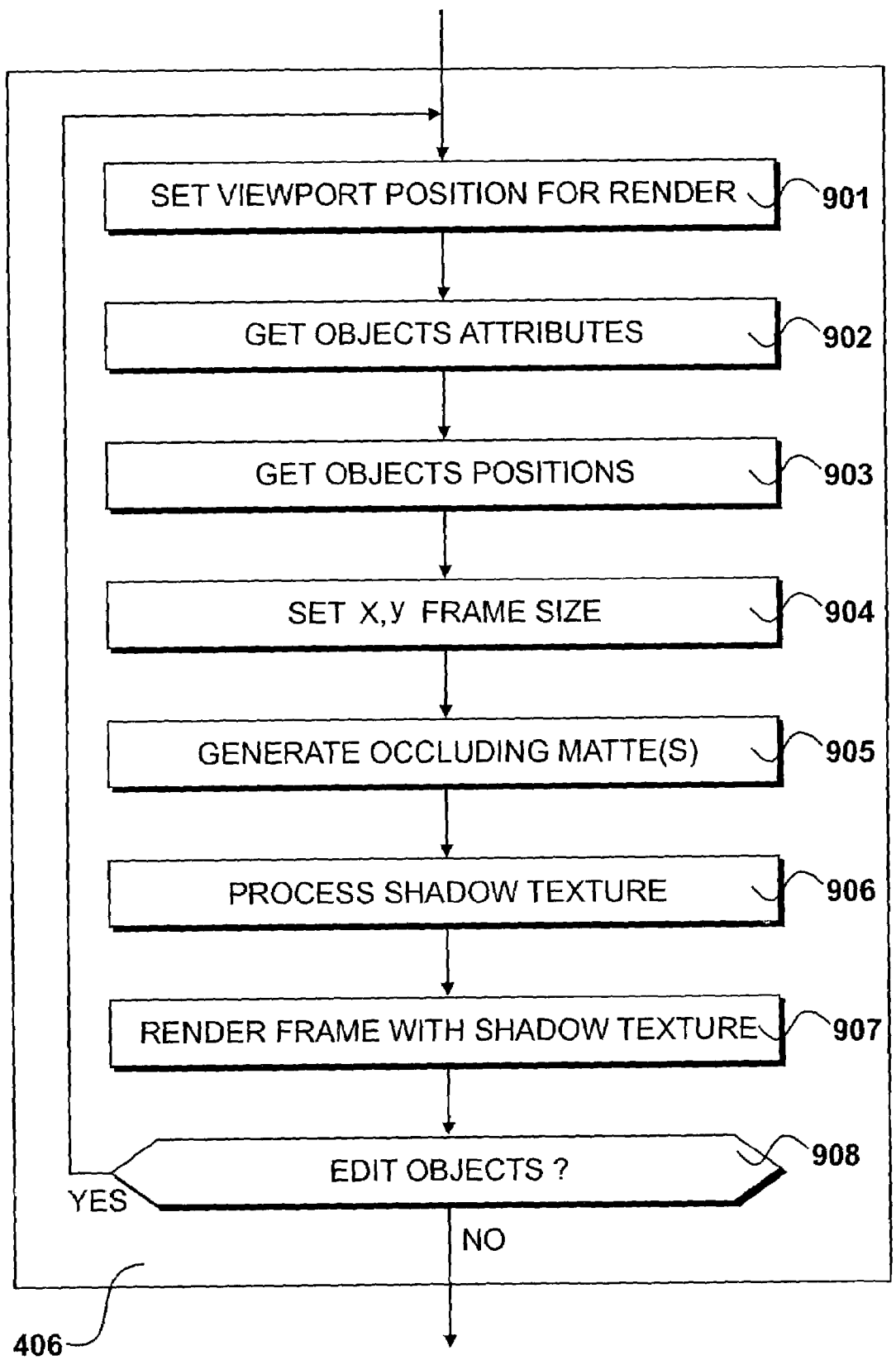
FIG. 9A further details the operational steps according to which the application according to the present invention renders the scene shown in FIGS. 6 and 7 with shadows according to the rendering step shown in FIG. 4, including a step of processing a shadow texture.

The present invention solves the problem shown as incorrect shadow 804 in FIG. 8 by means of generating a shadowed texture when rendering the scene shown at 702 in FIG. 7 with shadows according to step 406, the operational steps of which are further described in FIG. 9A.

FIG. 9A

At step 901, the position of viewport 704 and hence its view frustum are set within compositing space 702 with a reference to said space's tri-axis orthogonal co-ordinates system 703. In a preferred embodiment of the present invention, artist 107 is able to interact directly with viewport object 704 within GUI 701 by means of mouse 110 or graphic tablet 111. Upon selecting said viewport object, artist 107 may further adjust the angle and focus of its frustum upon activating user operable switch 715.

When the viewport position and frustum characteristics are set according to said step 901, the respective attributes of each three-dimensional object present within compositing space 702 are read, e.g. the frames currently depicted in each of player objects 705 to 707 and the luminosity, colour and orientation of each artificial light source 708, 709 are read at step 902. The respective positions of each of said objects 705 to 709 are then read at step 903, again in relation to the tri-axis orthogonal coordinates system 703 defining compositing space 702, such that the state and position of each object within compositing space 702 are defined in relation to said viewport 704 and its view frustrum.

At step 904, artist 107 specifies the X,Y area of the output image frame to be rendered through said viewport 704, in effect defining a frame size which may be expressed as a total number of pixels or according to known film and/or video standards. Accordingly, artist 107 may specify the required output image frame either as a known standard processing system resolution, such as VGA, SVGA or XGA or, alternatively, as PAL, NTSC or HTDV frame resolution. In effect, a total texture area is obtained from said specification step 904 which is the translation of said frame size into a length and width expressed in picture screen elements, otherwise known as pixels.

At step 905, application 502 generates light-occluding mattes from the image frames generated as the respective textures of players 706, 707, according to conventional matte generation techniques which are well known to those skilled the particular art of image frame compositing. Upon determining said texture size and at step 904 and generating said occluding mattes according to step 905, application 502 can subsequently process a shadow texture according to the present invention at step 906, wherein said shadow texture has substantially the same size as the texture size determined at step 905. A final output image frame suitable for previewing purposes is rendered with the shadow texture of step 906 at step 907. A question is asked at step 908, as to whether the three-dimensional objects within compositing space 702 require editing, for instance in terms of their attributes such as the image frame depicted within a player object, or in terms of their positions, for instance if the position of an image component within the final output image frame is artistically unsatisfactory and its corresponding three-dimensional object within compositing space 702 requires adjusting in relation to viewport 704.

If the question of step 908 is answered positively, control is subsequently returned to process step 901, whereby artist 107 may alter the attribute and/or position of viewport 704 or any other three-dimensional object within compositing space 702 according to steps 902 and 903. Alternatively, if the question of step 908 is answered positively, user 107 may now select another scene within which to implement shadows according to the present invention at step 407.

Figure 9B:
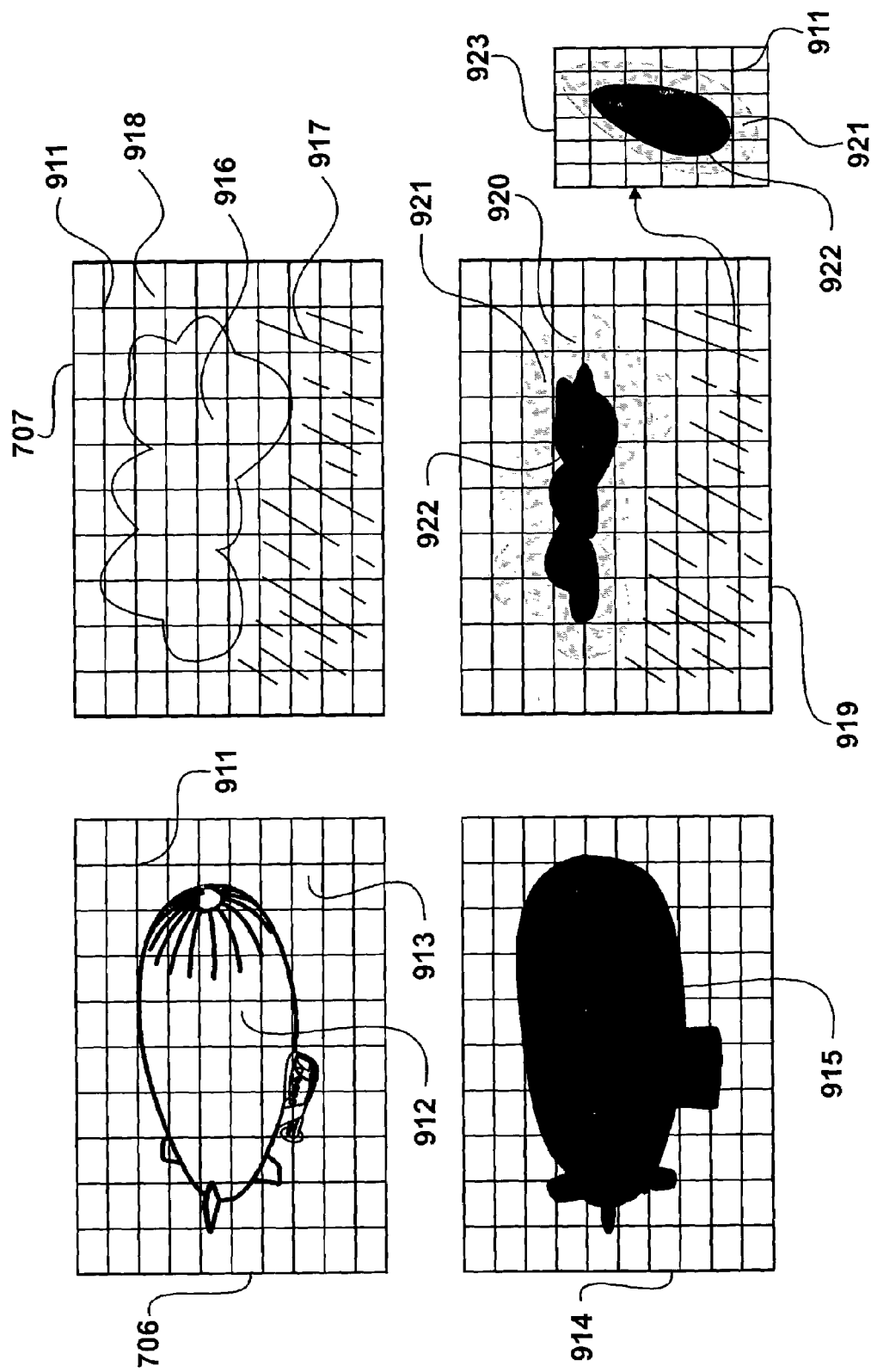
FIG. 9B provides a graphical representation of an occluding matte being respectively generated for the airship in the airship frame shown in FIGS. 6 to 8 and the cloud and raindrops of the cloud frame also shown in FIGS. 6 and 7.

Occluding mattes generated according to step 905 from player objects 706 and 707 are graphically represented in FIG. 9B.

FIG. 9B

The player object 706 is shown over which a mesh 911 has been superimposed to figuratively represent the resolution thereof in pixels. It will be apparent to those skilled in the art that said pixels are shown artificially enlarged for clarity and illustrative purposes only. As previously described, the texture applied to player object 706 is an image frame depicting an airship 912 filmed against a blue background 913. Consequently, the RGB colour component values of the pixels representing said background 913 have a relatively similar configuration, which is the background's blue uniform property. A light-occluding matte 914 can thus be easily generated according to step 905, wherein the blue background 913 is keyed-out and a matte is generated from the airship 912, e.g. the uniform RGB colour component values depicting said blue background 913 are set to be the minimal occlusion level, leaving only the shape 915 of the airship as the resulting matte.

Similarly, player object 707 is shown textured with the cloud and raindrops generated by frame processing node 610, thus including a cloud 916, a plurality of raindrops 917 and, preferably a background 918 also having a unifying colour property. To the contrary of airship 912 however, cloud 916 only partially occludes light projected thereon, for instance because artist 107 wants to realistically portray various levels of thickness in said cloud. Similarly, depending upon the level of resolution required for the final output image data, artist 107 may only want raindrops 917 to cast lighter shadows to take into account the level of transparency of the water they are formed of.

Consequently, an occluding matte 919 is generated from said player object 707 in which the cloud matte features various levels of increasing opacity 920, 921 and 922 and, similarly, the respective mattes of raindrops 917 also feature various levels of increasing opacity 921, 922, an example of which is shown magnified at 923.

Figure 10:
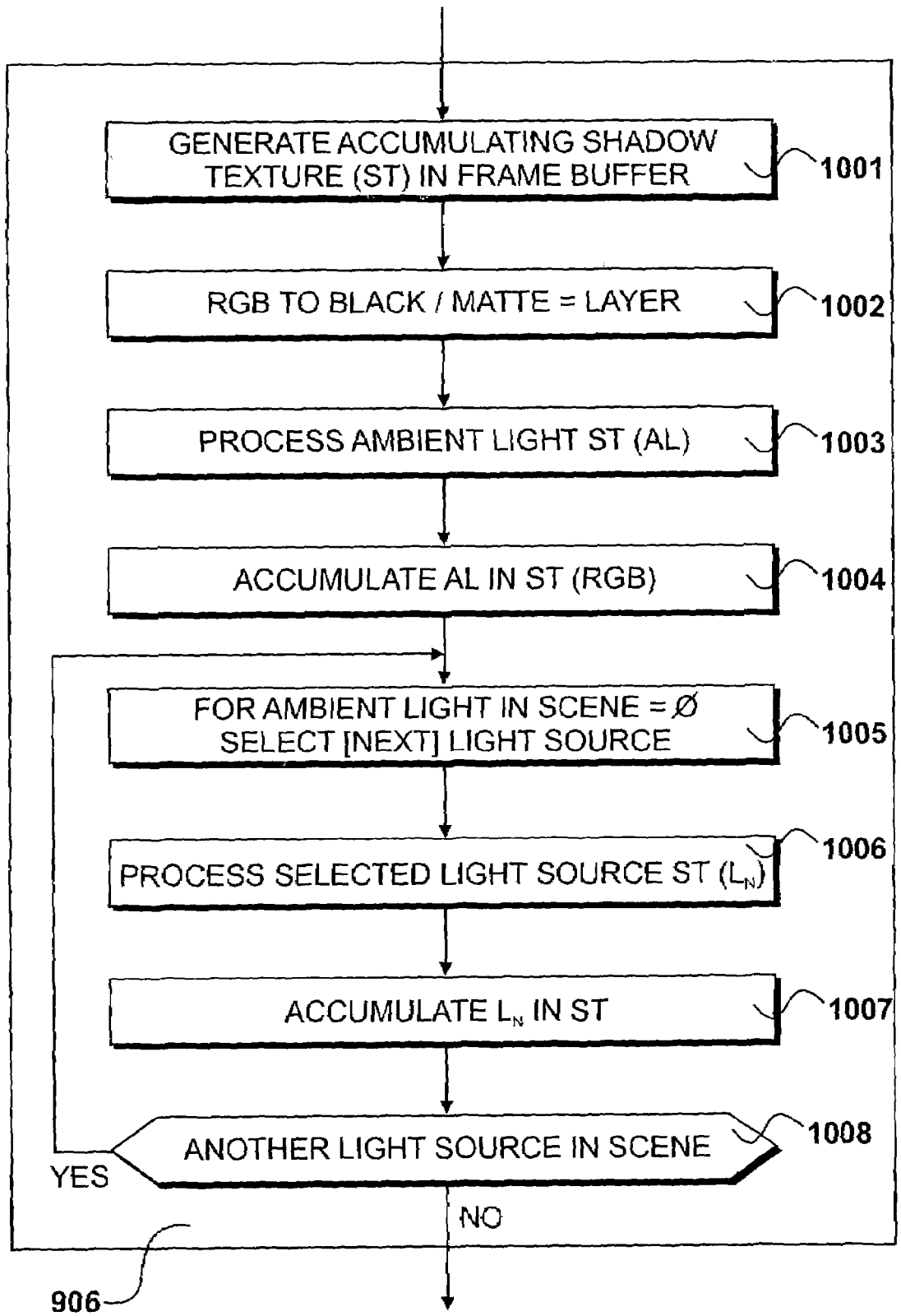
FIG. 10 further details the processing steps according to which the application according to the invention processes the shadow texture shown in FIG. 9A from an occluding matte shown in FIG. 9A, including a step of accumulating shadow textures for each light source in the scene.

The processing steps according to which the shadow texture is generated at step 906 are further detailed in FIG. 10.

FIG. 10

At step 1001, a first accumulating shadow texture (ST) is generated in frame buffer 309. Said accumulating shadow texture is preferably generated with the same size as the texture size determined at step 904 and its purpose is to blend a plurality of further accumulating shadow textures yet to be generated from the current scene configuration according to the present invention. The RGB channels of said first accumulating shadow texture are cleared to black and the matte is set to background frame 604 of player object 705 at step 1002, in readiness for accumulating said further shadow textures.

At step 1003, a second shadow texture is generated from the ambient light (AL) present within the scene, wherein said ambient light is preferably set by artist 107 and the result of which is accumulated in the accumulating shadow texture of steps 1001 and 1002 at step 1004. At step 1005, the ambient light in the scene is nulled and a first artificial light source 708 is individually selected, to the exclusion of any other artificial light source in said scene. In effect, the level of illumination within the scene is zeroed such that it is completely dark, whereby only the contribution of the light source 708 selected at step 1005 can be processed according to its specific attributes, eg direction, colour, intensity and position at step 1006. A lightspecific shadow texture (Ln) is thus obtained which can be subsequently accumulated in the accumulating shadow texture of steps 1001 and 1002, already including the ambient light shadow texture of steps 1003 and 1004, at step 1007.

At step 1008, a question is asked as to whether another artificial light source remains in the scene which is to be processed according to steps 1005 to 1007. If the question of step 1008 is answered positively, control is subsequently returned to step 1005, whereby he ambient light in the scene is nulled as is the light contribution of the previously selected light source 708 and a second light specific shadow texture (Ln+1) is generated and accumulated for light 709, and so on and so forth. Alternatively, the question of step 1008 is answered negatively, whereby the final output image frame may now be rendered with the now complete accumulating shadow texture according to step 907.

FIG. 11

Figure 11:
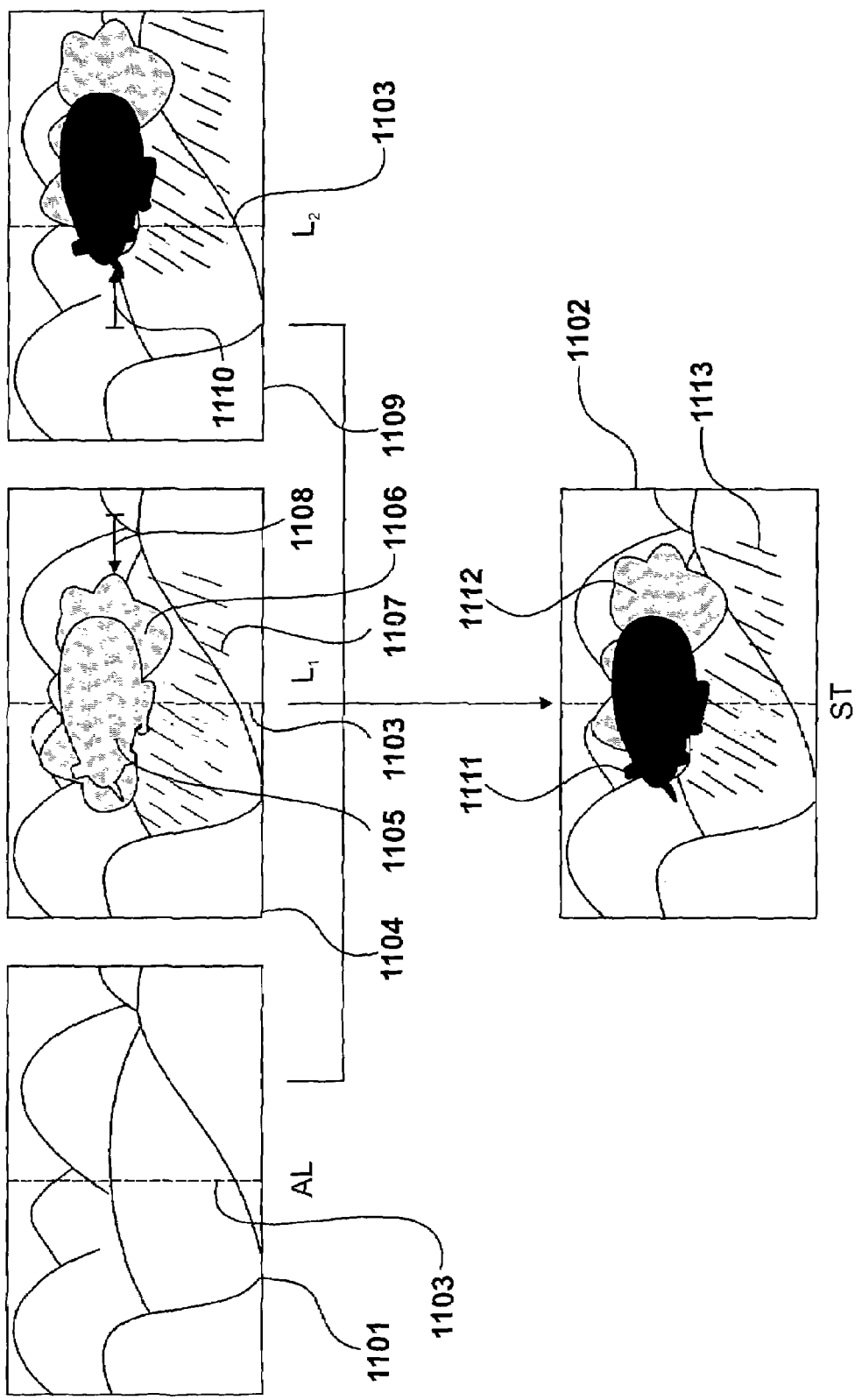
FIG. 11 shows a plurality of accumulated shadow textures accumulated in a temporary buffer.

The plurality of shadow textures iteratively generated according to steps 1003 to 1008 are illustrated in FIG. 11 as accumulating into the accumulating shadow texture initiated according to steps 1001 and 1002.

The first ambient light shadow texture (AL) 1101 is shown as generated according to step 1003 and accumulated into accumulating shadow texture (ST) 1102 according to step 1004. The representation of said first shadow texture 1101 includes a notional centre dividing line 1103 for the purpose of illustrating the relative movement of said shadows according to the perspective of the projection of said shadows depending upon the iterative light selection and further processing of steps 1005 to 1008. Accordingly, because it is the ambient light pass, no shadows are initially generated for either the airship or the cloud and raindrops combination.

In the example, light sources 708 and 709 respectively contribute different levels of illumination to the scene, the joint contribution of which would render the shadows described below less distinct and lighter than will be the case when shadow textures are generated for each of said artificial light sources further on. In accordance with the embodiment of the present invention, artificial light source 708 is selected according to step 1005 upon completing the generation of the ambient light shadow texture 1101. A second shadow texture 1104 specific to artificial light source 708 is generated according to step 1006 and further accumulated into accumulating shadow texture 1102 in frame buffer 309. Shadows 1105, 1106 and 1107 of respectively, the airship matte 914 of player object 706 and the cloud and raindrops matte 919 of player object 707 are shown as projected by both artificial light source object 708. Cloud and rain shadows 1106, 1107 are shown displaced in relation to notional marker 1103 by a distance 1108 and said displacement is induced by the perspective of the projection specific to artificial light source 708.

A third shadow texture 1109 is in turn generated according to artificial light source 709 being selected according to step 1005, which is also subsequently accumulated in accumulating shadow texture 1102. Again, the respective shadows of the airship, the cloud and the raindrops are displaced in relation to notional marker 1103 by a distance 1110 in relation to the perspective of the shadow projection. In the example, the shadow 1105 of the airship is noticeably darker than the shadows of the cloud and the raindrops, for instance because light source 709 is much closer to player object 706 than light source 708 is.

The final accumulated shadow texture 1102 thus depicts a fairly dark airship shadow 1111 superimposed over lighter cloud and raindrops shadows 1112, 1113. Said accumulating shadow texture 1102 effectively blends the successive shadow textures 1101, 1104 and 1109 to generate a blended average shadow texture.

Figure 12:
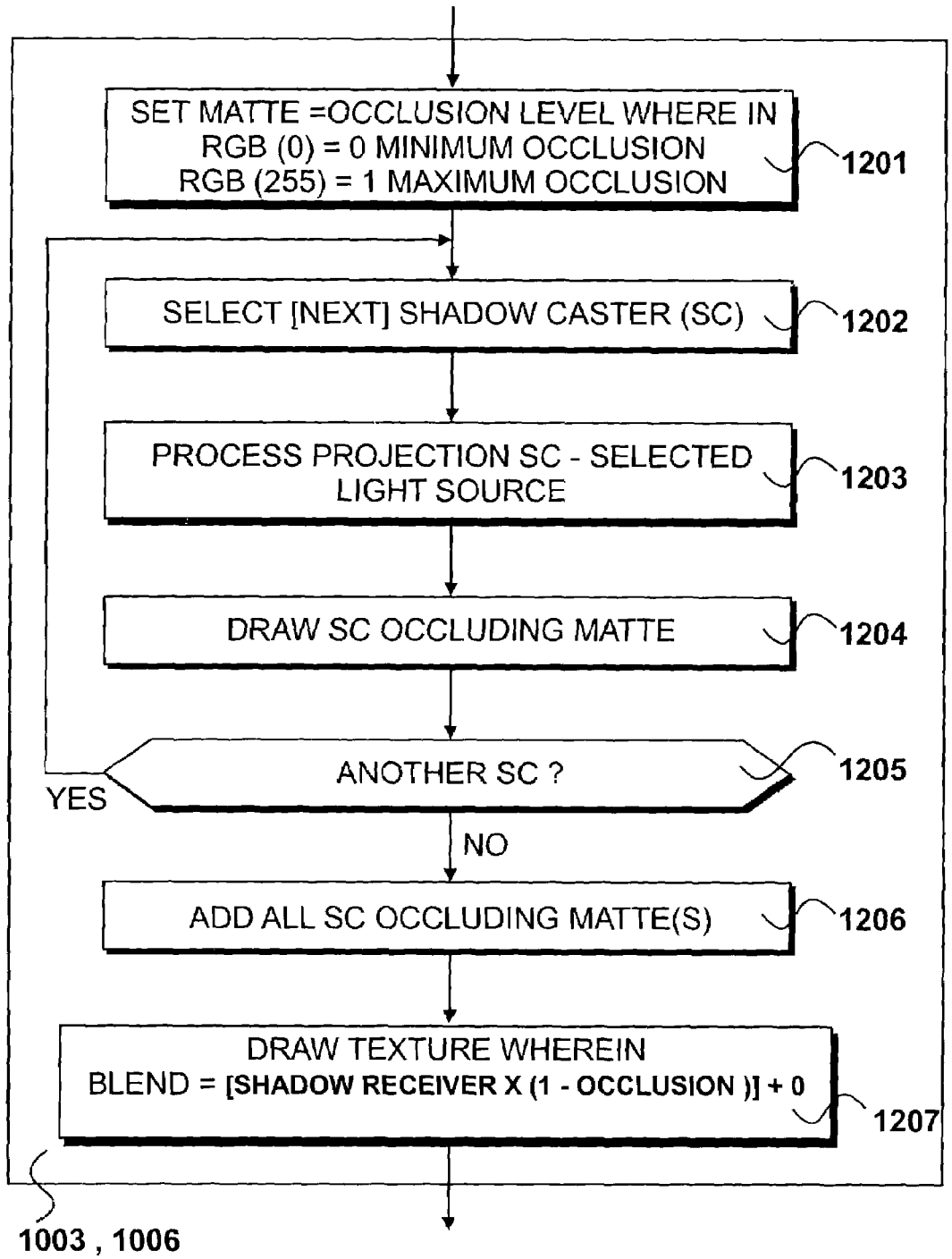
FIG. 12 further details the operational steps according to which shadow textures are generated for each light source as shown in FIGS. 10 and 11, including a step of drawing an occluding matte for each shadow caster.

The processing steps according to which shadow textures are generated for the respective contents of player objects 706, 707 according to steps 1003, 1006, as opposed to the shadows of said player objects themselves, are further detailed in FIG. 12.

FIG. 12

At step 1201, a generic occlusion level is set to consider shadow casters, such as the respective mattes 914, 919 of player objects 706, 707, wherein the absolute red, green and blue colour component values of each pixel of said mattes as textures according to step 1002 dictate whether said pixel is fully transparent, fully opaque or has a distinct level of opacity between said extremes.

At step 1202, a first shadow caster (SC) is selected such that an appropriate projection in three dimensions may be set and processed at step 1203 in relation to the currently selected light source and the shadow receiver, player object 705, whereby the occluding matte corresponding to said shadow caster can be accurately projected and drawn at step 1204. At step 1205, a question is asked as to whether another shadow caster remains to be processed in the scene in relation to the currently selected light source and the shadow receiver 705. In the example, the first selected shadow caster in relation to the first selected light source 708 and the shadow receiver 705 is the airship matte of texture 914, whereby the occluding matte of said airship is projected and drawn according to steps 1203 and 1204 and, if the question of step 1205 is answered affirmatively, control returns to step 1202, whereby the next shadow caster to be selected is the cloud and raindrops matte of texture 919, which are subsequently projected and drawn according to steps 1203 and 1204, and so on and so forth.

If the question of step 1205 is answered negatively, thereby meaning that an occluding matte has been drawn for every shadow caster in relation to the currently selected light source, all of said shadow caster occluding mattes are added at step 1206 such that the shadow texture, for instance shadow texture 1102, can be drawn at step 1207, wherein the respective red, green and blue colour component values of each pixel thereof are blended with the shadow receiver which, in the example, is player object 705. Said blending is for instance a function of the OpenGL API, which is well known to those skilled in the art.

With reference to step 1201, a magnified portion of the "airship" occluding matte 914 generated at step 905 is shown in FIG. 14 as an example of a single-level shadow having either pixels which are either fully transparent or fully opaque.

FIG. 14

The magnified portion 1401 of occluding matte 914 comprises an array of pixels 1402 approximately centred over the upper tail section of the airship 912. Pixels representing the uniform blue background 913, the RGB colour component values of which have been defined as the minimum occlusion level when generating matte 914, are thus given a null value 1403 when sampled. If the airship occluding matte 914 is the only occluding matte generated according to steps 1202 to 1206, such pixels have no incidence upon the result of the blending operation carried out when the texture is drawn according to step 1207.

Conversely, pixels having RGB colour component values different from those of said blue background pixels are given a maximum occlusion value 1404 of 255 when similarly sampled, in accordance with known matte generation processes. With respect to the hypothesis formulated thereabove, if the airship occluding matte 914 is the only occluding matte drawn according to steps 1202 to 1206, the incidence of such maximum occlusion values 1404 would result in a darkest shadow in the texture drawn according to step 1207. However, the preferred embodiment of the present invention provides for the additive superimposition of shadows possibly including multiple levels of opacity of a plurality of image components 912, 916 and 917.

Figure 15:
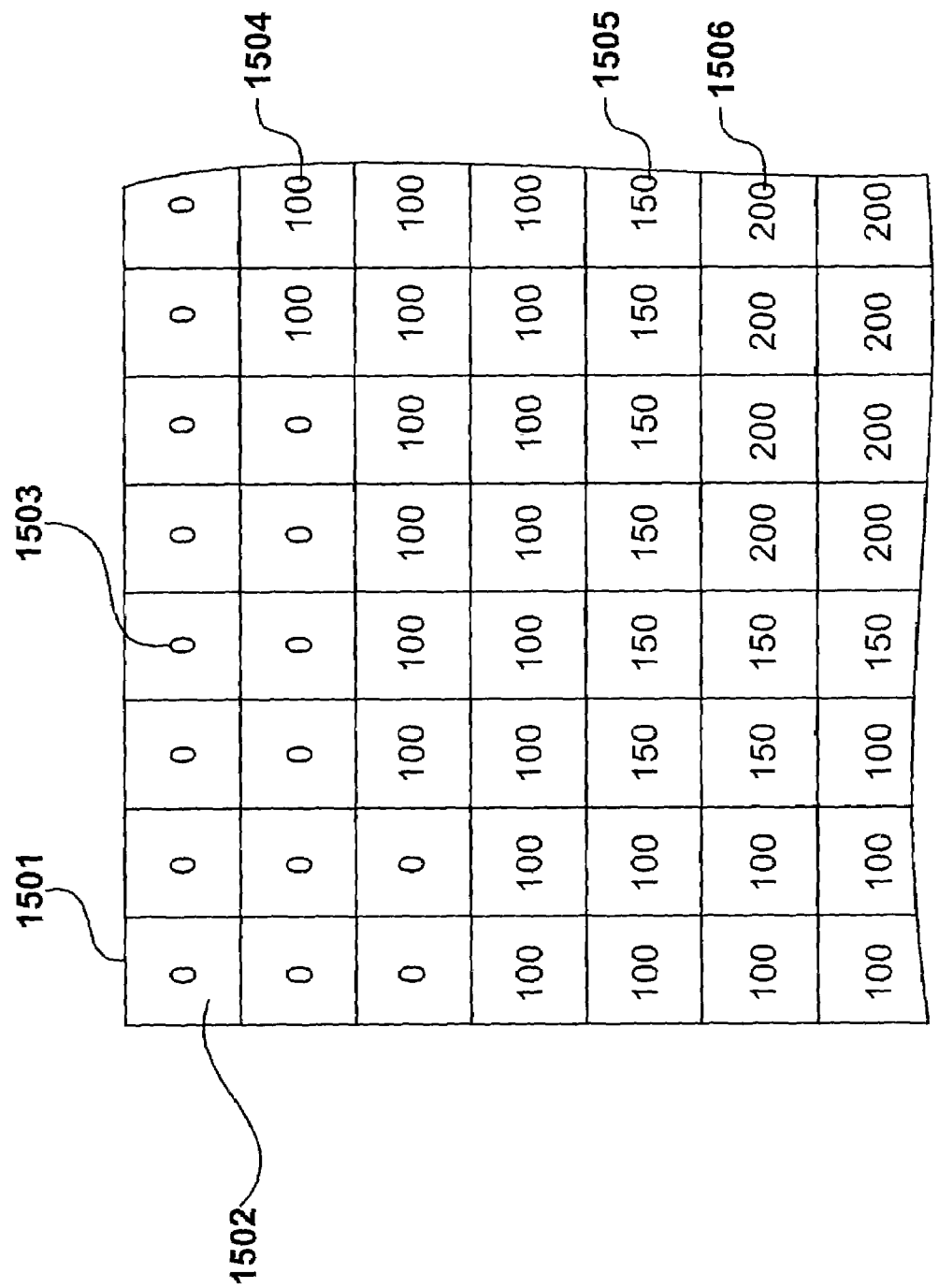
FIG. 15 further depicts a magnified portion of the partially opaque raindrop occluding matte shown in FIG. 9B, having pixels configured with levels of opacity.

Thus, again with reference to step 1201, A magnified portion of the raindrop occluding matte 923 generated at step 905 is shown in FIG. 15 as an example of a multiple-level shadow having either pixels which are either fully transparent, fully opaque, or partially opaque.

FIG. 15

The magnified portion 1501 of occluding matte 919 comprises an array of pixels 1502 approximately centred over the upper left corner of the pixel box 923. Pixels representing the uniform background 918, the RGB colour component values of which have been defined as the minimum occlusion level when generating matte 919 are thus given a null value 1503 when sampled. If the raindrop occluding matte 923 is the only occluding matte drawn according to steps 1202 to 1206, such pixels have no incidence upon the result of the blending operation carried out when the texture is drawn according to step 1207.

However, pixels having RGB colour component values different from those of said background pixels are given variable occlusion values 1504 to 1506 when similarly sampled, in accordance with the given matte and in relation to the values of said RGB colour component. Lower occlusions values 1504 may thus be derived from component values close to the component values indicating the background to be keyed out, whilst median occlusion values 1505 and higher occlusion values 1506 are derived as said component values exceed said component values indicating the background to be keyed out.

In accordance with the hypothesis formulated thereabove, if the raindrop occluding matte 923 is the only occluding matte drawn according to steps 1202 to 1206, the incidence of such variable occlusion values 1504 to 1506 would result in a shadow having multiple levels of opacity in the texture drawn according to step 1207.

Figure 16:
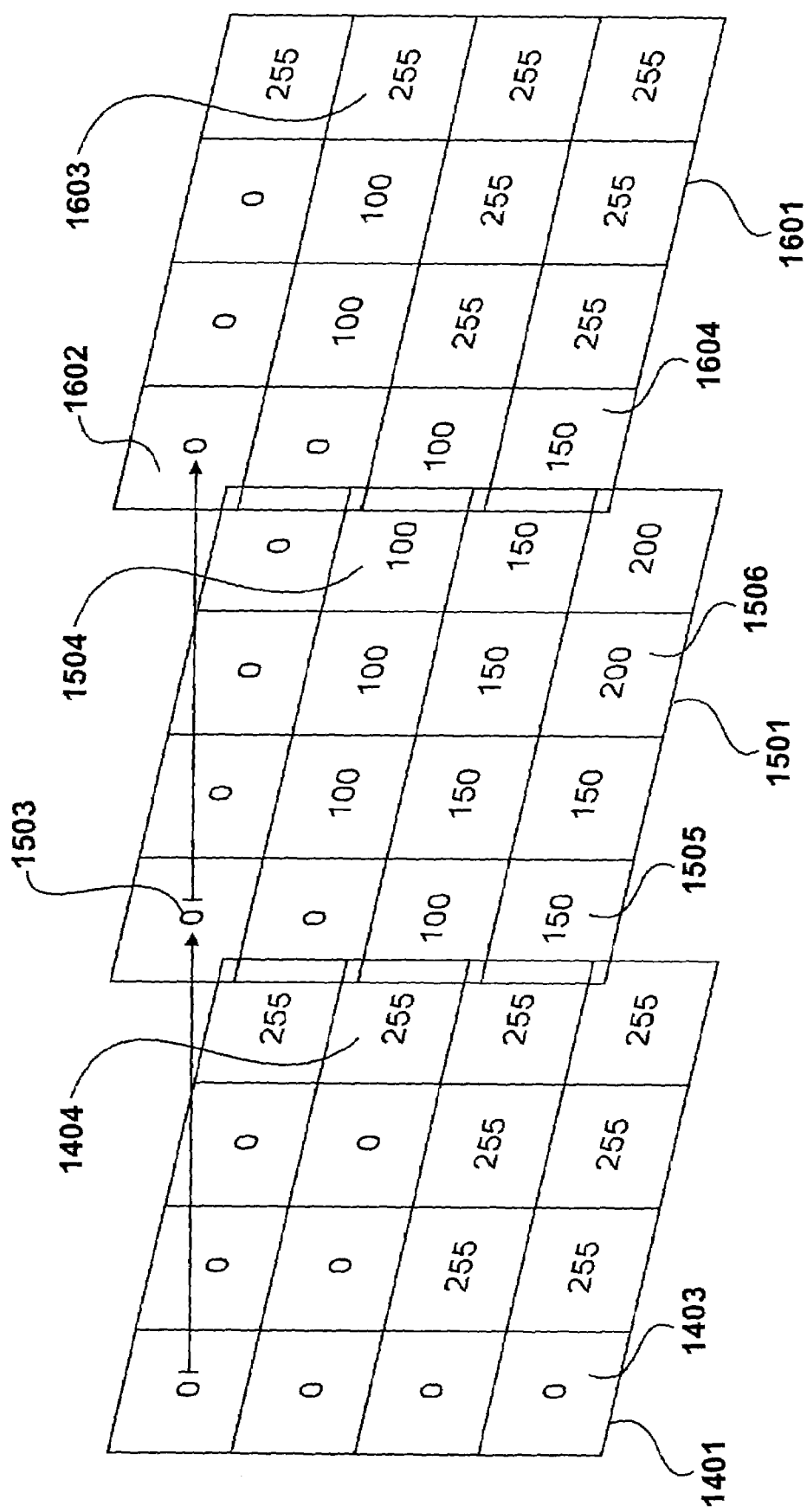
FIG. 16 provides a graphical representation of the accumulated shadow texture generated for a light source in the scene shown in FIGS. 6 and 7 according to the present invention.

A conceptual representation of the occluding matte addition of step 1206 is shown in FIG. 16 in relation to respective portions of the pixel arrays 1401 and 1501.

FIG. 16

A portion of the pixel array 1401 is shown including null values 1403 and maximum values 1404 positioned in perspective in front of a portion of the pixel array 1501, which also includes null values 1503, low occlusion values 1504, median occlusion values 1505 and high occlusion values 1506, to conceptually represent the stacking, i.e. addition, of said values at respective corresponding positions into a corresponding portion of the final occluding matte 1601 comprising pixels 1602. Final shadow occluding matte 1601 is generated according to step 1206, the pixel occlusion values thereof are used to draw the shadow textures such as shadow texture 1107, according to step 1207.

As the occlusion level is clamped between a total transparency value (1403,1503) and a maximum opacity null value (1404), the sum total of the occlusion values of an occluding matte pixel at a given position may not exceed said maximum occlusion value 1404, as shown at 1603, where said total 1603 of value 1404 and 1505 should equal 355. However, so long as said total remains under said maximum occlusion value 1404, said occlusion values are added, as shown at 1604, irrespectively of the number of shadow casters' occluding mattes drawn according to steps 1202 to 1205.

A highly accurate shadow shape and opacity may therefore be obtained according to the present invention from image components within a tree-dimensional compositing space 702, which shadowing techniques according to the known prior art cannot generate.

Figure 17:
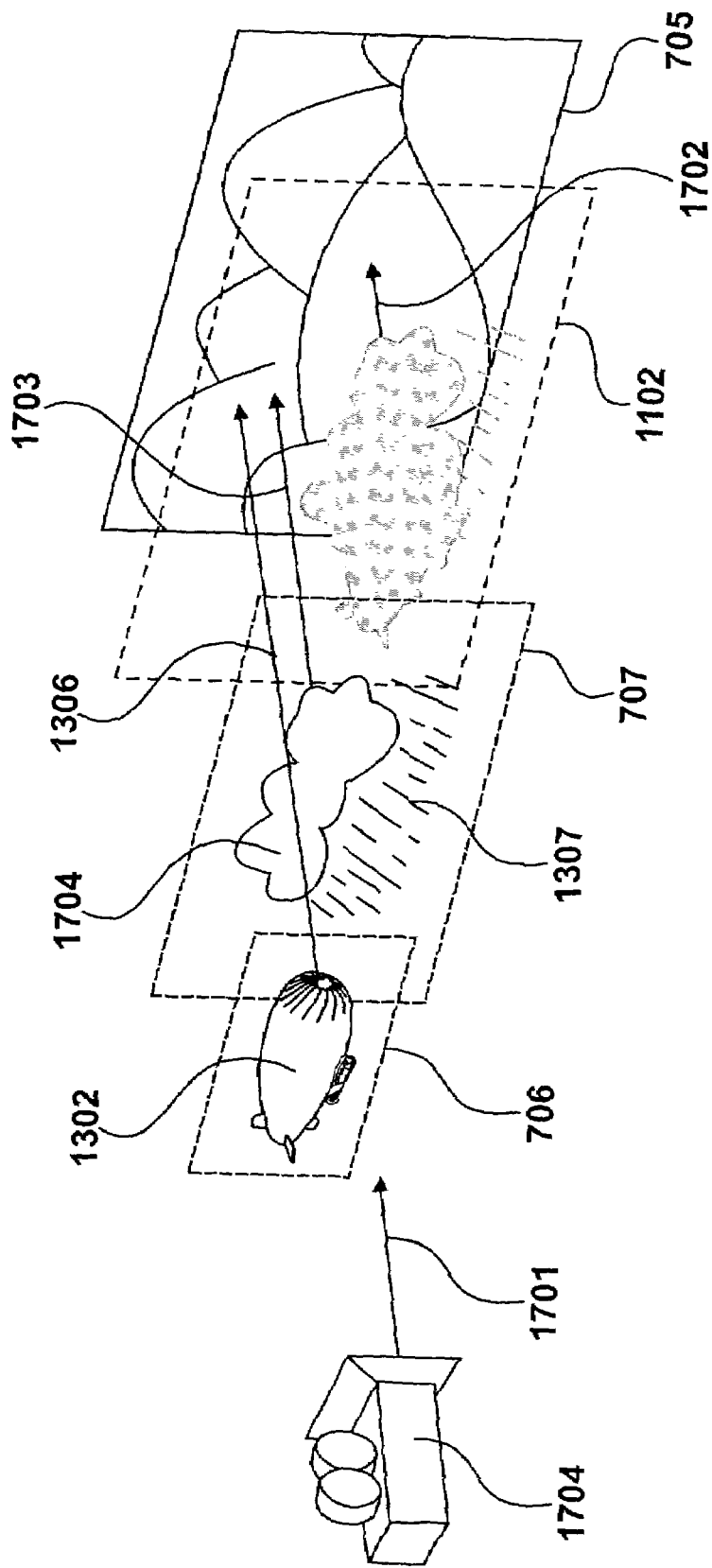
FIG. 17 provides a graphical representation of a final output image frame being rendered with a shadow texture in relation to a viewport according to the rendering step shown in FIG. 9.

Upon completing the drawing of a blended texture shown in FIG. 16 according to steps 1003 and 1006 for all of the light sources 708, 709 within the compositing space 702 and, further, completing the accumulation of said textures according to steps 1004 and 1007, the accumulating shadow texture 1102 is now complete such that the final output image frame 601 may be rendered according to step 907, including said texture 1102. Said rendering of said final output image frame according to said step 907 is illustrated in FIG. 17.

FIG. 17

It was previously explained that viewport 704 is configured with a frustum through which any visible objects within compositing space 702 are rendered within a two-dimensional image frame. Thus, said frustum is configured with a viewing direction 1701 and, preferably, with a focus, the extremity of which is the background image frame generated from frame processing node 604 and instantiated within space 702 as player 705. In order to effect the required image processing to generate image frame 601, user 107 has preferably set the output frame size at step 904 as the total area of said player 705, whereby the accumulating shadow texture is initially generated with the same size at step 1001. According to the present invention, complete accumulating shadow texture 1102 is firstly mapped (1702) as a texture onto said player object 705 using conventional texture/mapping, pixel co-ordinates-matching process steps known to those skilled in the art with keying out pixels therein having a null value, as shown in FIG. 16. Thus, only the shadows are superimposed over the original "hills" image frame texture equipping player object 705.

The cloud 916 and associated raindrops 917 of player object 707 are composited (1703) onto the shadowed texture of player object 705 by means of keying out the background of the "cloud" image frame in said player 707, as was previously described when generating the occluding matte thereof. Finally, airship 912 of player object 706 is similarly composited (1704) using the same process steps.

The above compositive rendering is known to those skilled in the art as rendering layers but the present invention is not limited thereto and may be similarly used in an environment wherein said rendering is know as multiple-pass rendering.

What I claim is:

1. Apparatus for processing image data, comprising image data storage means, memory means for storing instructions and a data structure including a plurality of image data processing nodes representing processing to be performed upon said image data in a compositing space, processing means for processing said instructions, wherein said instructions define operations to be performed in order to process said image data according to said data structure and are processed by said processing means to perform the steps of:

(a) generating at least one of said data processing nodes as a three-dimensional object within the compositing space having at least one artificial light source;

(b) defining a user-positioned viewport in said space configured with a frustum enclosing said object;

(c) generating a matte of said object in relation to said artificial light source within said space;

(d) accumulating said matte in an accumulating shadow texture, wherein said accumulating comprises:
   (i) accumulating ambient light shadow texture into said accumulating shadow texture; and
   (ii) iteratively generating a shadow texture for each artificial light source and accumulating said generated shadow texture into the accumulating shadow texture; and (e) rendering said object including said accumulating shadow texture in an image frame defined by said frustum.

2. Apparatus according to claim 1, wherein said three-dimensional object is a mesh of vertices defining at least one polygon.

3. Apparatus according to claim 2, wherein at least one texture is applied to said polygon.

4. Apparatus according to claim 3, wherein said image data to be processed by said data processing nodes is applied to said three-dimensional object as a texture.

5. Apparatus according to claim 4, wherein the step of generating a matte of said object further includes the step of generating a matte of said texture.

6. Apparatus according to claim 5, wherein said matte comprises levels of light occlusion clamped between a minimum level of opacity and a maximum level of opacity.

7. Apparatus according to claim 6, wherein the step of accumulating said matte in an accumulating shadow texture further includes the step of adding said levels of light occlusion at pixel-related positions in said accumulating shadow texture.

8. Apparatus according to claim 1, wherein a light-specific shadow texture is generated for each light source in a compositing space having a plurality of light sources.

9. Apparatus according to claim 8, wherein said matte is accumulated in said light-specific shadow texture.

10. Apparatus according to claim 9, wherein the step of accumulating said matte in an accumulating shadow texture further includes the step of adding said levels of light occlusion in said light-specific shadow textures at pixel-related positions in said accumulating shadow texture.

11. A method of processing image data, including image data stored in storage means, a data structure stored in memory means comprising a plurality of image data processing nodes representing processing to be performed upon said image data in a compositing space, and processing means, wherein said method comprises the steps of
   (a) generating at least one of said data processing nodes as a three-dimensional object within the compositing space having at least one artificial light source;
   (b) defining a user-positioned viewport in said space configured with a frustum enclosing said object;
   (c) generating a matte of said object in relation to said artificial light source within said space;
   (d) accumulating said matte in an accumulating shadow texture, wherein said accumulating comprises:
      (i) accumulating an ambient light shadow texture into said accumulating shadow texture; and
      (ii) iteratively generating a shadow texture for each artificial light source and accumulating said generated shadow texture into the accumulating shadow texture; and
   (e) rendering said object including said accumulating shadow texture in an image frame defined by said frustum.

12. A method according to claim 11, wherein said three-dimensional object is a mesh of vertices defining at least one polygon.

13. A method according to claim 12, wherein at least one texture is applied to said polygon.

14. A method according to claim 13, wherein said image data to be processed by said data processing nodes is applied to said three-dimensional object as a texture.

15. A method according to claim 14, wherein the step of generating a matte of said object further includes the step of generating a matte of said texture.

16. A method according to claim 15, wherein said matte comprises levels of light occlusion clamped between a minimum level of opacity and a maximum level of opacity.

17. A method according to claim 16, wherein the step of accumulating said matte in an accumulating shadow texture further includes the step of adding said levels of light occlusion at pixel-related positions in said accumulating shadow texture.

18. A method according to claim 11, wherein a light-specific shadow texture is generated for each light source in a compositing space having a plurality of light sources.

19. A method according to claim 18, wherein said matte is accumulated in said light-specific shadow texture.

20. A method according to claim 19, wherein the step of accumulating said matte in an accumulating shadow texture further includes the step of adding said levels of light occlusion in said light-specific shadow textures at pixel-related positions in said accumulating shadow texture.

21. A computer readable medium having computer readable instructions executable by a computer, such that said computer performs the steps of:
   (a) from a data structure comprising a plurality of image data processing nodes representing processing to be performed upon image data in a compositing space, generating a data processing node as a three-dimensional object within the compositing space having at least one artificial light source;
   (b) defining a user-positioned viewport in said space configured with a frustum enclosing said object;
   (c) generating a matte of said object in relation to said artificial light source within said space;
   (d) accumulating said matte in an accumulating shadow texture, wherein said accumulating comprises:
      (i) accumulating an ambient light shadow texture into said accumulating shadow texture; and
      (ii) iteratively generating a shadow texture for each artificial light source and accumulating said generated shadow texture into the accumulating shadow texture; and
   (e) rendering said object including said accumulating shadow texture in an image frame defined by said frustum.

22. A computer readable medium according to claim 21, wherein said image data to be processed by said data processing nodes is applied to said three-dimensional object as a texture.

23. A computer readable medium according to claim 22, wherein the step of generating a matte of said object further includes the step of generating a matte of said texture.

24. A computer readable medium according to claim 23, wherein said matte comprises levels of light occlusion clamped between a minimum level of opacity and a maximum level of opacity.

25. A computer readable medium according to claim 24, wherein the step of accumulating said matte in an accumulating shadow texture further includes the step of adding said levels of light occlusion at pixel-related positions in said accumulating shadow texture.

26. A computer system programmed to generate image data, comprising image data storage means, memory means for storing instructions and a data structure including a plurality of image data processing nodes representing processing to be performed upon said image data in a compositing space, processing means for processing said instructions, wherein said instructions define operations to be performed in order to process said image data according to said data structure and instruct said programmed computer system to perform the steps of
   (a) generating at least one of said data processing nodes as a three-dimensional object within the compositing space having at least one artificial light source;
   (b) defining a user-positioned viewport in said space configured with a frustun enclosing said object;
   (c) generating a matte of said object in relation to said artificial light source within said space;
   (d) accumulating said matte in an accumulating shadow texture, wherein said accumulating comprises:
     (i) accumulating an ambient light shadow texture into said accumulating shadow texture; and
     (ii) iteratively generating a shadow texture for each artificial light source and accumulating said generated shadow texture into the accumulating shadow texture; and
   (e) sendering said object including said accumulating shadow texture in an image frame defined by said frustum.

* * * * *

UNITED STATES PATENT AND TRADEMARK OFFICE
CERTIFICATE OF CORRECTION

| | | |
|---|---|---|
| PATENT NO. | : 7,142,709 B2 | |
| APPLICATION NO. | : 10/219116 | |
| DATED | : November 28, 2006 | |
| INVENTOR(S) | : Martin Girard | |

It is certified that error appears in the above-identified patent and that said Letters Patent is hereby corrected as shown below:

On the title page add the foreign application priority data as follows:

(item 30)

-- Foreign Application Priority Data

Aug. 14, 2002 (GB) ................... 0218895 --

Signed and Sealed this

Twenty-seventh Day of February, 2007

JON W. DUDAS
*Director of the United States Patent and Trademark Office*